(12) United States Patent
Schoner

(10) Patent No.: US 8,194,757 B2
(45) Date of Patent: Jun. 5, 2012

(54) METHOD AND SYSTEM FOR COMBINING RESULTS OF MOSQUITO NOISE REDUCTION AND BLOCK NOISE REDUCTION

(75) Inventor: Brian Schoner, Freemont, CA (US)

(73) Assignee: Broadcom Corporation, Irvine, CA (US)

( * ) Notice: Subject to any disclaimer, the term of this patent is extended or adjusted under 35 U.S.C. 154(b) by 2100 days.

(21) Appl. No.: 11/089,788

(22) Filed: Mar. 25, 2005

(65) Prior Publication Data

US 2006/0171473 A1    Aug. 3, 2006

Related U.S. Application Data

(60) Provisional application No. 60/648,302, filed on Jan. 28, 2005.

(51) Int. Cl.
  *H04N 7/12* (2006.01)
  *H04N 11/02* (2006.01)

(52) U.S. Cl. .................... 375/240.27; 375/240.2

(58) Field of Classification Search ............ 375/240.27, 375/240.2
See application file for complete search history.

(56) References Cited

U.S. PATENT DOCUMENTS

| | | | | |
|---|---|---|---|---|
| 5,828,467 A | * | 10/1998 | Suzuki | 382/268 |
| 5,959,693 A | * | 9/1999 | Wu et al. | 348/624 |
| 7,031,546 B2 | * | 4/2006 | Maeda et al. | 382/260 |
| 7,346,226 B2 | * | 3/2008 | Shyshkin | 382/275 |
| 7,412,109 B2 | * | 8/2008 | Kong et al. | 382/261 |
| 2002/0167602 A1 | * | 11/2002 | Nguyen | 348/280 |
| 2003/0210830 A1 | * | 11/2003 | Goto | 382/268 |
| 2004/0165785 A1 | * | 8/2004 | Monobe et al. | 382/268 |
| 2006/0245506 A1 | * | 11/2006 | Lin et al. | 375/240.29 |

OTHER PUBLICATIONS

International Organization for Standardization, ISO/IEC JTC 1/SC 29/WG 11, Coding of Moving Pictures and Audio, "Information Technology—Coding of Audio-Visual Objects—Part 2: Visual, Amendment 1: Visual Extensions, Annex F—Preprocessing and Postprocessing", Maui, Hawaii, USA, Dec. 1999.

* cited by examiner

*Primary Examiner* — David Czekaj
*Assistant Examiner* — Anner Holder
(74) *Attorney, Agent, or Firm* — Thomas, Kayden, Horstemeyer & Risley, LLP.

(57) ABSTRACT

In a video system, a method and system for combining results of mosquito noise reduction and block noise reduction are provided. Noise artifacts may be reduced in a video image by generating a first pixel correction value that combines a first and a second noise reduction parameters utilizing a first combination operation. Combining the first pixel correction value and a third noise reduction parameter utilizing a second combination operation may generate a second pixel correction value. New pixel values may be determined for the video image by adding an original pixel value and the pixel correction value. The noise reduction parameters may correspond to results from mosquito and block noise reduction operations. The first and second combination operations may be selected to be a maximum, a minimum, or an addition of the input parameters based on the sign of the input parameters.

26 Claims, 22 Drawing Sheets

| A10 | A11 | A12 |
|-----|-----|-----|
| B10 | B11 | B12 |
| C10 | C11 | C12 |

METHOD AND SYSTEM FOR COMBINING RESULTS OF MOSQUITO NOISE REDUCTION AND BLOCK NOISE REDUCTION

CROSS-REFERENCE TO RELATED APPLICATIONS/INCORPORATION BY REFERENCE

This patent application makes reference to, claims priority to and claims benefit from U.S. Provisional Patent Application Ser. No. 60/648,302, filed on Jan. 28, 2005.

This application makes reference to:
U.S. patent application Ser. No. 11/087,491 filed Mar. 22, 2005;
U.S. patent application Ser. No. 11/083,597 filed Mar. 18, 2005; and
U.S. patent application Ser. No. 11/090,642 filed Mar. 25, 2005.

The above stated applications are hereby incorporated herein by reference in Their entirety.

FIELD OF THE INVENTION

Certain embodiments of the invention relate to video processing. More specifically, certain embodiments of the invention relate to a method and system for combining results of mosquito noise reduction and block noise reduction.

BACKGROUND OF THE INVENTION

Advances in compression techniques for audio-visual information have resulted in cost effective and widespread recording, storage, and/or transfer of movies, video, and/or music content over a wide range of media. The Moving Picture Experts Group (MPEG) family of standards is among the most commonly used digital compressed formats. A major advantage of MPEG compared to other video and audio coding formats is that MPEG-generated files tend to be much smaller for the same quality. This is because MPEG uses very sophisticated compression techniques. However, MPEG compression may be lossy and, in some instances, it may distort the video content. In this regard, the more the video is compressed, that is, the higher the compression ratio, the less the reconstructed video resembles the original information. Some examples of MPEG video distortion are a loss of texture, detail, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is the area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. In this regard, operations that are utilized to reduce compression-based blur are generally called image enhancement operations. When MPEG video compression results in added distortion on the video image it is said to produce "artifacts" on the video image. For example, the term "mosquito noise" may refer to MPEG artifacts that may be caused by the quantization of high spatial frequency components in the image. Mosquito noise may also be referred to as "ringing" or "Gibb's effect." In another example, the term "block noise" may refer to MPEG artifacts that may be caused by the quantization of low spatial frequency information in the image. Block noise may appear as edges on 8×8 blocks and may give the appearance of a mosaic or tiling pattern on the video image.

Some of the characteristics of mosquito noise may result from the fact that it is an artifact of the 8×8 block Discrete Cosine Transform (DCT) operation in MPEG compression. While generally confined to a particular 8×8 block of video samples, in some instances, motion compensation may result in mosquito noise beyond the block boundary. Mosquito noise commonly appears near luma edges, making credits, text, and/or cartoons particularly susceptible to this form of artifact. Mosquito noise may be more common, and generally more severe, at low bit rates. For example, mosquito noise may be more severe when macroblocks are coded with a higher quantization scale and/or on a larger quantization matrix.

Mosquito noise may tend to appear as very high spatial frequencies within the processing block. In some instances, when the input video to the MPEG compression operation has any motion, the mosquito noise generated may tend to vary rapidly and/or randomly resulting in flickering noise. Flickering noise may be particularly objectionable to a viewer of the decompressed video image. In other instances, when the input video to the MPEG compression operation is constant, the mosquito noise that results is generally constant as well. Horizontal edges tend to generate horizontal ringing while vertical edges tend to generate vertical ringing. While mosquito noise may also occur in the color components or chroma of a video image, it may generally be less of a problem since it is less objectionable to a viewer of the decompressed video image.

Some of the characteristics of block noise may result from the fact that it is an artifact of the 8×8 block discrete cosine transform (DCT) operation in MPEG compression. Block noise may generally occur near a block boundary. While block noise may occur anywhere on an image, it is more commonly seen in nearly smooth regions, such as the sky and faces, or in high motion or high variance regions, such as moving water. Block noise may be more common, and generally more severe, at low bit rates. For example, block noise may be more severe when macroblocks are coded with a higher quantization scale and/or on a larger quantization matrix. While block noise is typically caused by quantization of low spatial frequency terms that result from the DCT operation, it is not generally caused by the quantization of the DC term. For example, MPEG compression generally provides at least 8 bits when quantizing the DC term of intra coded blocks.

Block noise may also appear at discontinuities located at or near the block edges. The block boundaries may remain fixed even when the video image moves. In this regard, a static block pattern may stand out strongly against a moving background, a condition that may be highly objectionable from a viewer's perspective. In some instances, however, motion vectors generated during MPEG compression may cause block noise to move with the video image, but this is generally less common and less objectionable from a viewer's perspective. Block noise may be more objectionable on vertical edges than on horizontal edges, particularly on an interlaced display.

Block noise may generally be more pronounced in certain picture coding types. For example, block noise may be often worse in intra coded pictures or I-pictures and in predicted pictures or P-pictures. While block noise is generally associated with the luma component of a video image, it may also occur in the chroma component of a video image. However, the block noise in the chroma component may generally be less of a problem since it is less objectionable to a viewer of the decompressed video image.

There have been attempts to provide normative approaches for reducing the effects of mosquito noise. For example, the MPEG4 specification ISO/IEC 14496-2:1999/Amd.1:2000 (E) Annex F comprises a state-of-the-art mosquito noise filter, which is also called a deringing filter, which may be utilized to filter out mosquito noise. However, the MPEG4-based deringing filter may have several limitations. For example, the MPEG4 deringing filter may have a hard threshold based on the binary index operation bin(h,v). Accordingly, small changes in pixel values may cause the filter to turn ON or OFF, causing objectionable pixel flickering. The MPEG4 deringing filter may only be applied to 8×8 blocks. This may limit the utility of the deringing filter since under high-motion and/or low bit rate conditions motion compensation may move mosquito noise beyond the transform block edges. The deringing filter kernel is symmetrical vertically and horizontally and as a result, the deringing filter may not correct for interlaced video, where the vertical pixel or sample distance is twice the horizontal pixel distance. Another limitation arises because the detection algorithm utilized by the MPEG4 deringing filter may often overfilter or underfilter video images. Moreover, the detection algorithm may utilize a 10×10 block of pixels or samples to detect mosquito noise and this large block size may be very expensive for raster-scan implementations.

The MPEG4 specification ISO/IEC 14496-2:1999/Amd.1: 2000(E) Annex F also comprises a state-of-the-art block noise filter, which is also called a deblocking filter. However, the MPEG4-based deblocking filter may have several limitations. For example, the block noise detection algorithm utilized by the deblocking filter is based only on a few neighboring pixels and, as a result, may frequently filter real content erroneously. Horizontal edges may be filtered utilizing a similar approach as with vertical edges, making this method inappropriate for interlaced video and resulting in artifacts caused by the filtering process. Moreover, horizontal edge filtering may require 10 vertically adjacent pixels, for example. For raster-scanned video this may require 9 lines stores, which may make the implementation very expensive.

Future solutions to the presence of these types of video compression artifacts may need to provide cost effective and easy to implement reductions in mosquito and block noise without any perceptible degradation in video quality. Furthermore, even though block noise and mosquito noise may be reduced, the manner in which they are realized may result in perceptible degradation of video quality.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for combining results of mosquito noise reduction and block noise reduction, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for combining results of mosquito noise reduction and block noise reduction. Noise artifacts may be reduced in a video image by generating a first pixel correction value that combines a first and a second noise reduction parameters utilizing a first combination operation. Combining the first pixel correction value and a third noise reduction parameter utilizing a second combination operation may generate a second pixel correction value. New pixel values may be determined for the video image by adding an original pixel value and the pixel correction value. The noise reduction parameters may correspond to results from mosquito and block noise reduction operations. The first and second combination operations may be selected to be a maximum, a minimum, or an addition of the input parameters based on the sign of the input parameters. Note that the following discussion will generally use the terms "image" and "picture" interchangeably. Accordingly, notions of difference between the terms "image" and "picture" should not limit the scope of various aspects of the present invention. U.S. patent application Ser. No. 11/087,491 filed Mar. 22, 2005, discloses a detailed method and system for mosquito noise reduction, and is hereby incorporated herein by reference in its entirety. U.S. patent application Ser. No. 11/090,642 filed Mar. 25, 2005, discloses a detailed method and system for block noise reduction, and is hereby incorporated herein by reference in its entirety.

Figure 1A:
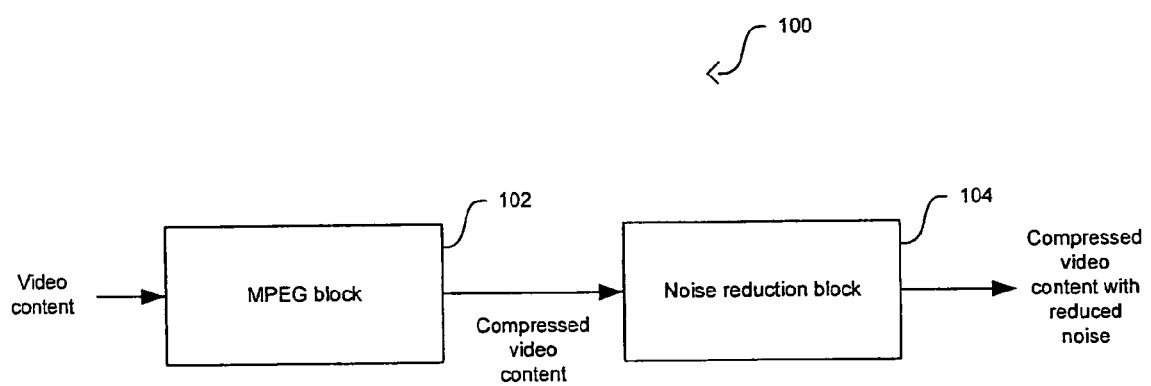
FIG. 1A is a block diagram of an exemplary video processing system that may be utilized for noise reduction, in accordance with an embodiment of the invention.

FIG. 1A is a block diagram of an exemplary video processing system that may be utilized for noise reduction, in accordance with an embodiment of the invention. Referring to FIG. 1A, there is shown a video processing system 100 that comprises an MPEG block 102 and a noise reduction block 104. The MPEG block 102 may comprise suitable logic, circuitry, and/or code that may be adapted to receive video content and generate compressed video content. The noise reduction block 104 may comprise suitable logic, circuitry, and/or code that may be adapted to reduce the noise of compressed video content received from the MPEG block 102. The noise reduction block 104 may be adapted to perform a plurality of noise reduction operations on the compressed video content to reduce noise effects in a manner that provides visually pleasing results to a viewer.

Figure 1B:
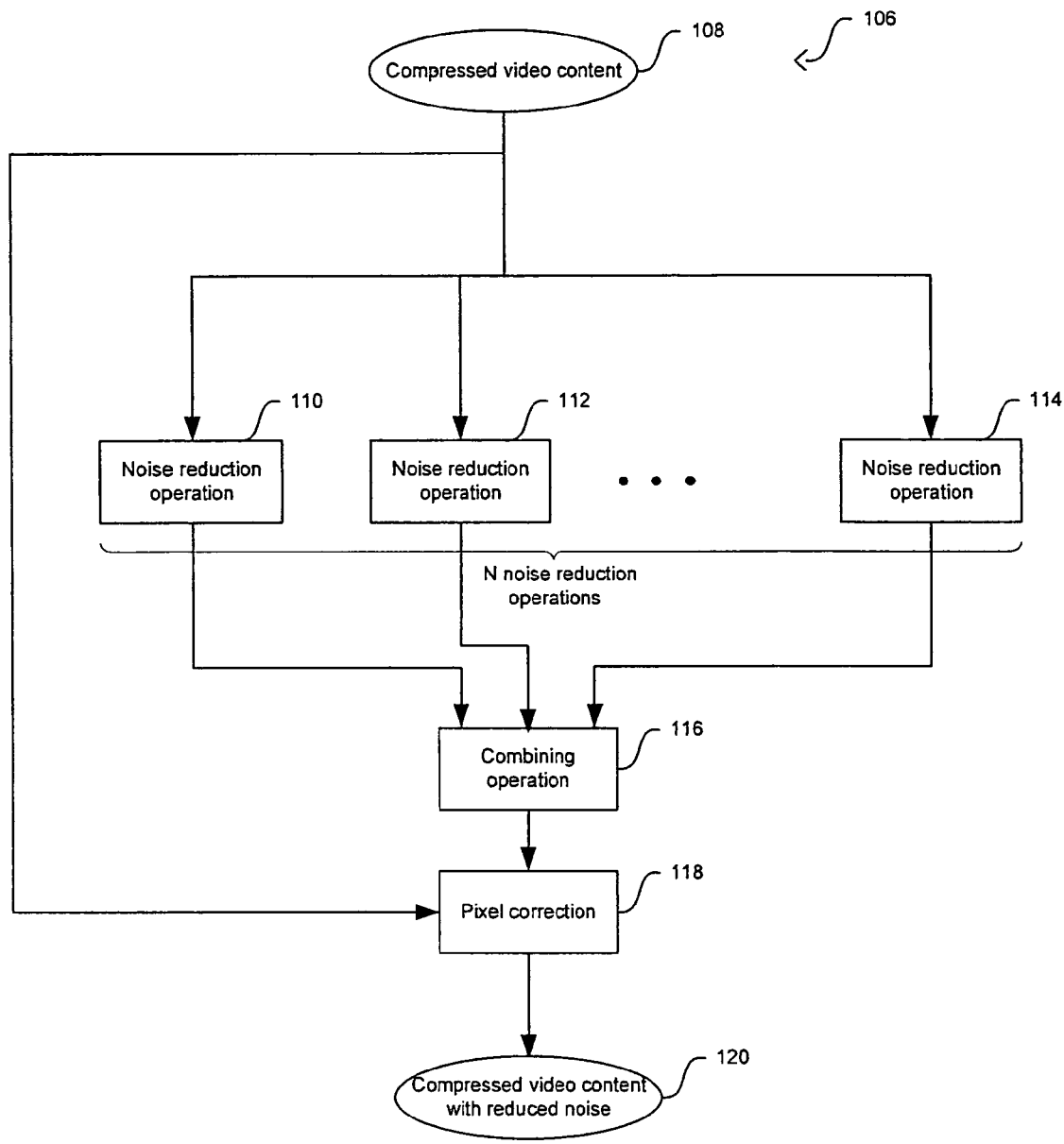
FIG. 1B is a flow diagram illustrating exemplary steps performed by the noise reduction block, in accordance with an embodiment of the invention.

FIG. 1B is a flow diagram illustrating exemplary steps performed by the noise reduction block, in accordance with an embodiment of the invention. Referring to FIG. 1B, in step 108, the noise reduction block 104 may receive compressed video content from the MPEG block 102. In steps 110 through 114, the block noise reduction block 104 may process the received compressed video content and generate a plurality of noise correction parameters. For example, step 110 may correspond to the generation of a noise reduction parameter that corresponds to a first noise effect that may result from the compression performed by the MPEG block 102. Similarly, steps 112 through 114 may correspond to the generation of noise reduction parameters that correspond to a second through an Nth noise effect that may result from the compression performed by the MPEG block 102. In step 116, the noise reduction parameters may be combined to provide a pixel correction value that provides a combined correction of all the noise effects considered in the N noise reduction operations. In step 118, a pixel correction operation may be performed, and a corrected pixel value may be generated, based on the pixel correction value from step 116 and the original value of the pixels on the compressed video content received in step 108. In step 120, a compressed video content with reduced noise may be generated from the pixel correction operation in step 118.

The steps comprising the noise reduction operations 110 through 114 may be adapted to reduce the effects of, for example, mosquito noise and/or block noise on the compressed video content. In this regard, the steps comprising the combining operation 116 and/or the pixel reduction 118 may also be adapted to reduce the effects of mosquito noise and/or block noise on the compressed video content.

Figure 2A:
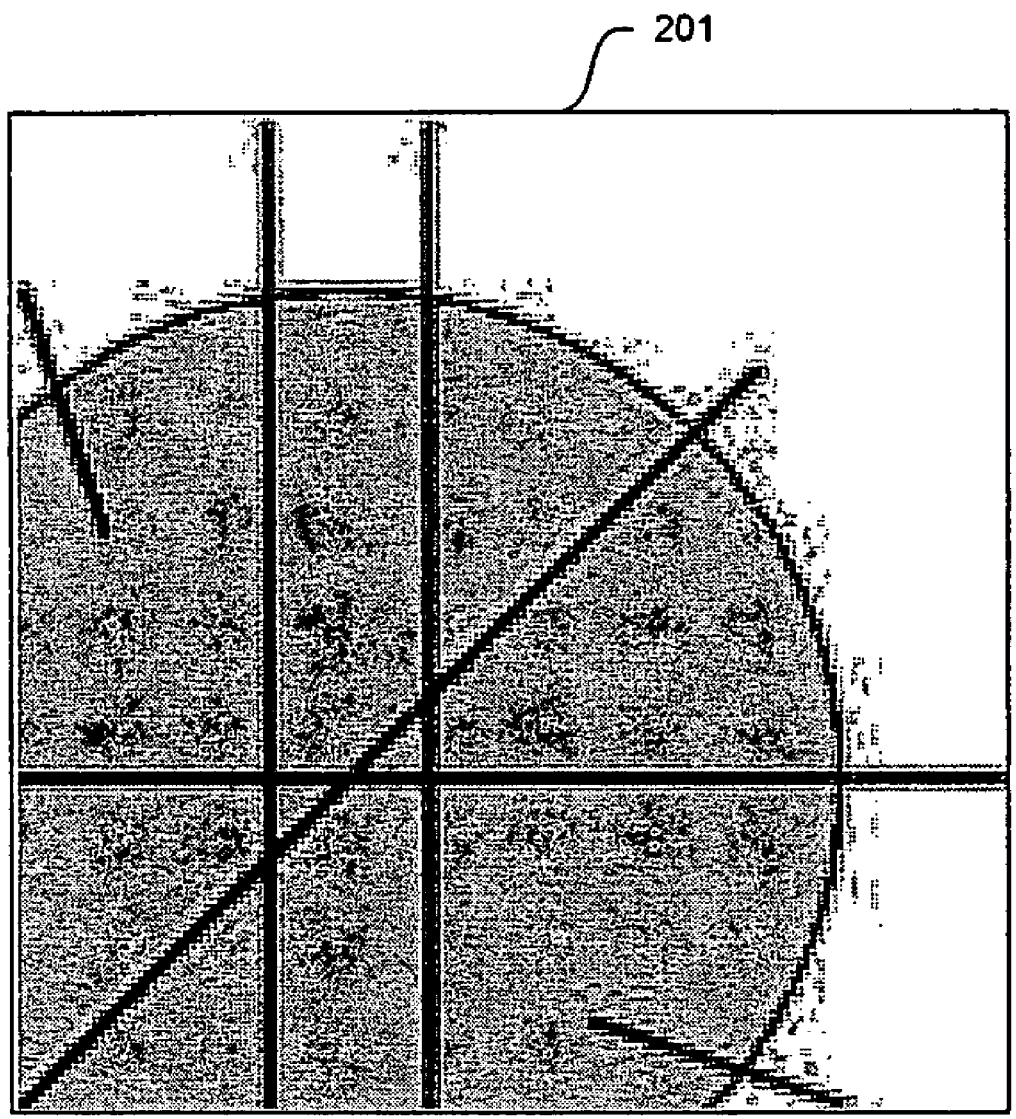
FIGS. 2A-2B illustrate various aspects of mosquito noise and block noise in video systems, in accordance with an embodiment of the invention.
Figure 2B:
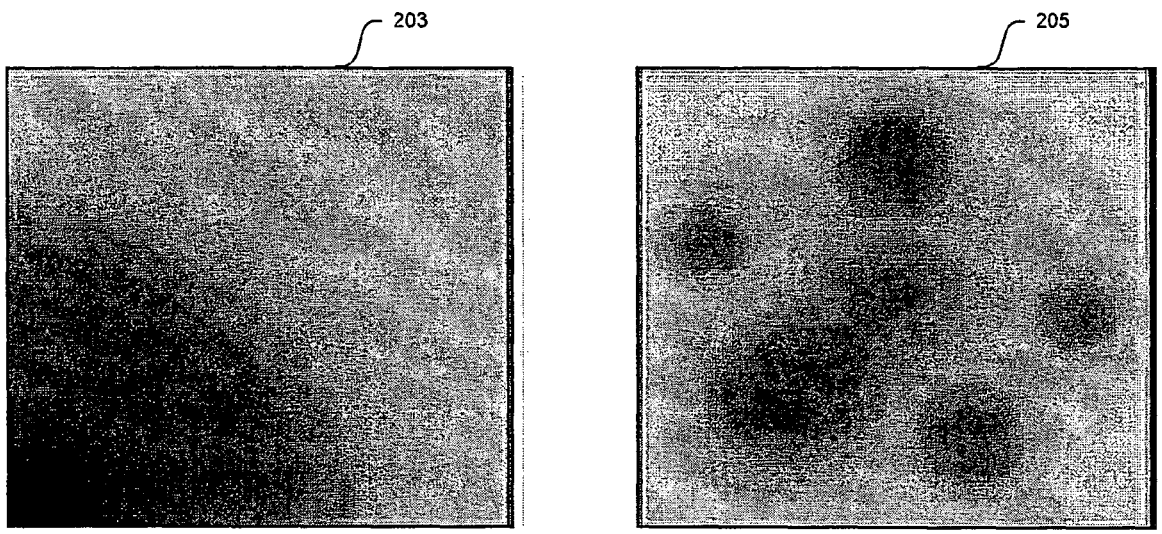

FIGS. 2A-2B illustrate various aspects of mosquito noise and block noise in video systems, in accordance with an embodiment of the invention. Referring to FIG. 2A, there is shown a video image 201 comprising typical mosquito noise. Mosquito noise is block based and tends to occur near sharp edges. In some instances, horizontal edges may cause horizontal ringing and vertical edges may cause vertical ringing. Vertical and horizontal ringing may be additive, for example. When the edges are diagonal, a checkerboard pattern may occur near the diagonal edge. The checkerboard patterns may be stronger near an intersection between a horizontal and a vertical edge the ringing that occurs in horizontal or vertical edges. Moreover, mosquito noise may not fade away from edges as the fast fourier transform (FFT) ringing that occurs as a result of Gibb's phenomenon. In some instances, the largest mosquito noise spike may actually occur farthest from the edge.

Referring to FIG. 2B, there is shown a first image 203 and a second image 205 which illustrate visual artifacts that result from block noise in nearly-smooth regions of the image. Other aspects of the video content and processing, for example, coding type, bit rate, video motion, may also contribute to the presence of block noise in the first image 203 and in the second image 205.

Because mosquito noise and block noise may be related to the MPEG block structure, several factors, including field or frame coding of macroblocks, chroma coding format, for example, 4:4:4/4:2:2/4:2:0, and field or frame raster scan from a feeder may need to be considered for an effective noise reduction implementation. For example, in MPEG2 main profile and in MPEG2 simple profile, chroma may be coded as 4:2:0 and may generally have block noise on 16×16 image blocks or macroblocks. The original video content may be coded into macroblocks as field data or as frame data. The original video may be coded as frame pictures by utilizing a field or frame DCT coding. When the frame DCT coding is utilized, an 8×8 luma block may comprise 4 lines from each field. When the field DCT coding is utilized, an 8×8 luma block may comprise 8 lines from a single field. The original video may also be coded as field pictures in which case an 8×8 luma block may comprise 8 lines from a single field.

Figure 2C:
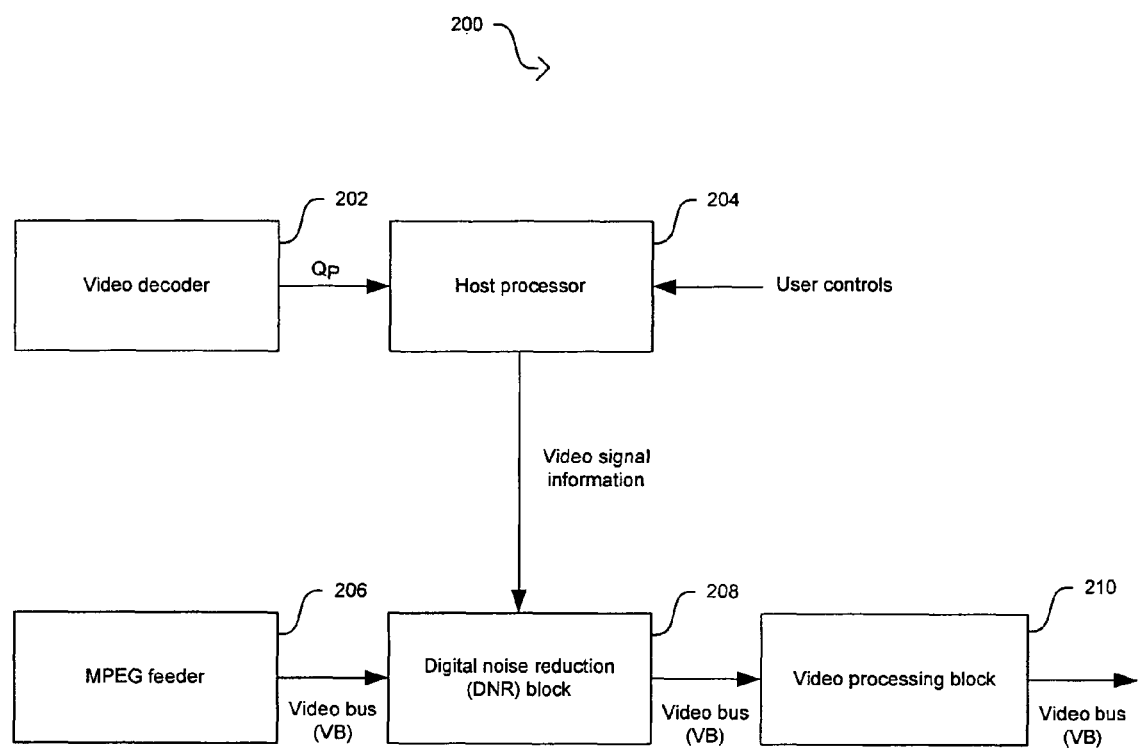
FIG. 2C is a block diagram of an exemplary video processing system that may be utilized for mosquito noise reduction (MNR) and/or block noise reduction (BNR), in accordance with an embodiment of the invention.

FIG. 2C is a block diagram of an exemplary video processing system that may be utilized for mosquito noise reduction (MNR) and/or block noise reduction (BNR), in accordance with an embodiment of the invention. Referring to FIG. 2C, there is shown a video processing system 200 comprising a video decoder 202, a processor 204, an MPEG feeder 206, a digital noise reduction (DNR) block 208, and a video processing block 210. In this regard, the video processing system 200 may be an example of the video processing system 100 described in FIG. 1A where the effects of mosquito noise and block noise in the compressed video content are to be reduced. The video decoder 202 may comprise suitable logic, circuitry, and/or code that may be adapted to decode compressed video information. The host processor 204 may comprise suitable logic, circuitry, and/or code that may be adapted to process quantization information, Qp, received from the video decoder 202 and/or user control information received from at least one additional device or processing block. The host processor 204 may be adapted to generate video signal information that corresponds to a current picture based on the processed quantization information and/or user control information. The generated video signal information may comprise, for example, threshold settings, indications of whether a video field is a top field or a bottom field, indications of whether the video signal is interlaced or progressive, and/or the size of the video image. The host processor 204 may transfer the video signal information to the DNR block 208. In some instances, at least a portion of the video signal information may be received by the DNR block 208 via a register direct memory access (DMA).

The MPEG feeder 206 may comprise suitable logic, circuitry, and/or code that may be adapted to transfer a plurality of MPEG-coded images to the DNR block 208 via a video bus (VB), for example. In this regard, the VB may utilize a specified format for transferring images from one processing or storage block to another processing or storage block. The DNR block 208 may comprise suitable logic, circuitry, and/or code that may be adapted to reduce some artifacts that may result from MPEG coding. In this regard, the DNR block 208 may be adapted to process MPEG-coded images to reduce mosquito noise. The processing performed by the DNR block 208 may be based on the contents of a current video image and on the video signal information corresponding to that current video image transferred from the host processor 204. The video signal information may be programmed or stored into registers in the DNR block 208 during the vertical blanking interval, for example. This programming approach may reduce any unpredictable behavior in the DNR block 208. The DNR block 208 may be adapted transfer the processed MPEG-coded images to the video processing block 210 via the VB. The video processing block 210 may comprise suitable logic, circuitry, and/or code that may be adapted to perform various image processing operations such as scaling and/or deinterlacing, for example, on the processed MPEG-coded images received from the DNR block 208.

When the pictures from the MPEG feeder 206 are coded as field pictures they may be transferred to the DNR block 208 as field pictures. When the pictures from the MPEG feeder 206 are coded as frame pictures they may be transferred to the DNR block 208 as frame or field pictures in accordance with the video stream format and/or the display. In this regard, frame pictures that are transferred to the DNR block 208 as field pictures may have mosquito noise on 4 vertical line boundaries.

The DNR block 208 may also be adapted to provide post-processing operations for the Advanced Video Codec (AVC) and/or the Windows Media (VC9) codec. The deblocking or artifact reduction operations performed by the DNR block 208 may be relaxed for AVC and VC9 because they specify in-loop deblocking filters. For example, AVC transforms may exhibit less ringing than the 8×8 DCT utilized in MPEG. Moreover, while AVC and VC9 allow image block sizes smaller than 8×8 to be utilized, processing at the sub-block level may present some difficulties and the DNR block 208 may perform deblocking filtering for AVC and VC9 without sub-block processing.

Figure 3:
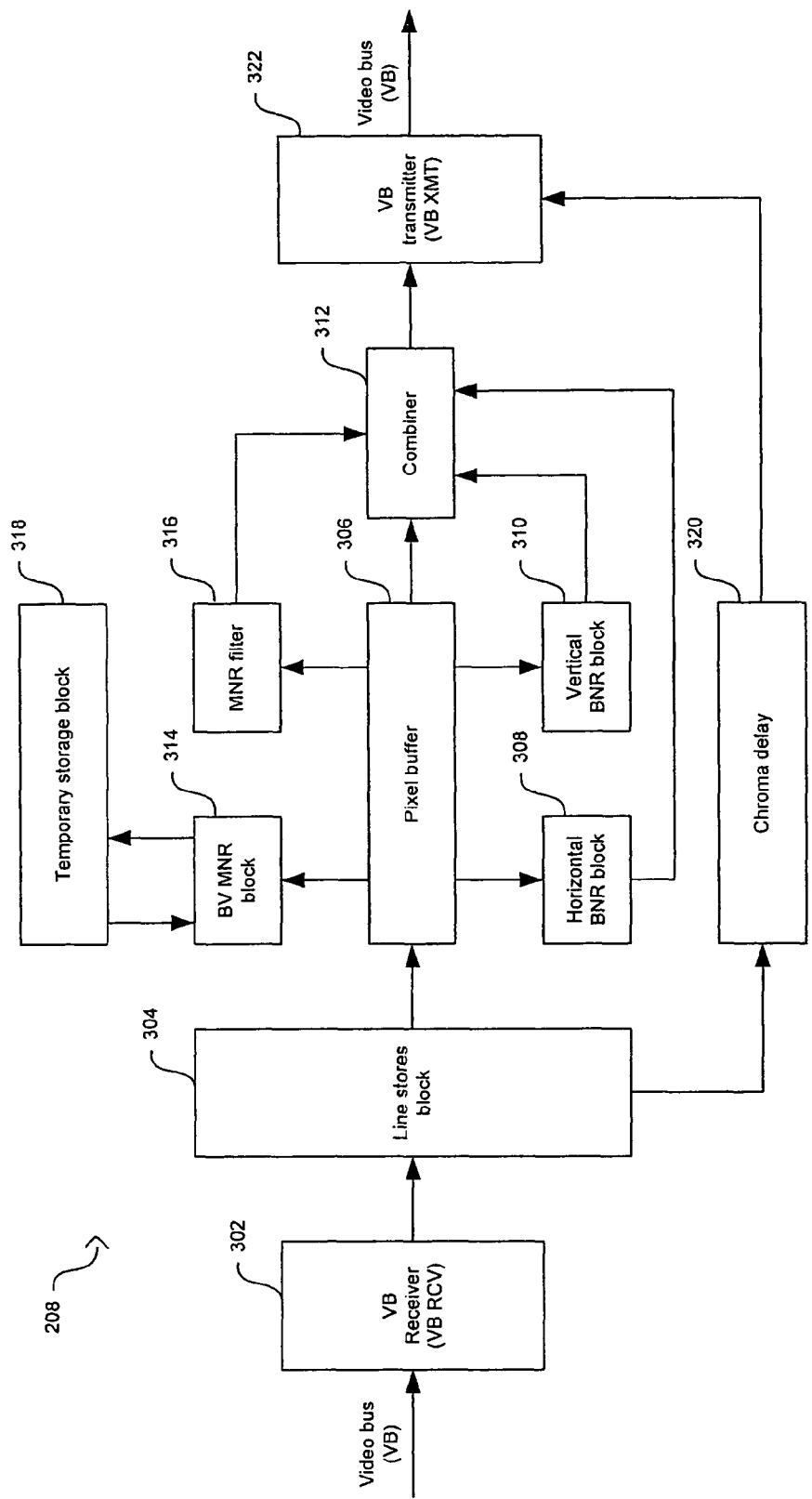
FIG. 3 is a block diagram of an exemplary top-level partitioning of the DNR, in accordance with an embodiment of the invention.

FIG. 3 is a block diagram of an exemplary top-level partitioning of the DNR, in accordance with an embodiment of the invention. Referring to FIG. 3, the DNR block 208 described in FIG. 2 may comprise a VB receiver (VB RCV) 302, a line stores block 304, a pixel buffer 306, a combiner 312, a horizontal block noise reduction (BNR) block 308, a vertical BNR block 310, a block variance (BV) mosquito noise reduction (MNR) block 314, an MNR filter 316, a temporary storage block 318, and a chroma delay block 720, and a VB transmitter (VB XMT) 322.

The VB RCV 302 may comprise suitable logic, circuitry, and/or code that may be adapted to receive MPEG-coded images in a format that is in accordance with the bus protocol supported by the VB. The VB RCV 302 may also be adapted to convert the received MPEG-coded video images into a different format for transfer to the line stores block 304. The line stores block 304 may comprise suitable logic, circuitry, and/or code that may be adapted to convert raster-scanned luma data from a current MPEG-coded video image into parallel lines of luma data. The line stores block 304 may be adapted to operate in a high definition (HD) mode or in a standard definition (SD) mode. Moreover, the line stores block 304 may also be adapted to convert and delay-match the raster-scanned chroma information into a single parallel line. The pixel buffer 306 may comprise suitable logic, circuitry, and/or code that may be adapted to store luma information corresponding to a plurality of pixels from the parallel lines of luma data generated by the line stores block 304. For example, the pixel buffer 306 may be implemented as a shift register. The pixel buffer 306 may be common to the MNR block 314, the MNR filter 316, the horizontal BNR block 308, and the vertical BNR block 310 to save on, for example, floating point operations per second (flops).

The BV MNR block 314 may comprise suitable logic, circuitry, and/or code that may be adapted to determine a block variance parameter for image blocks of the current video image. The BV MNR block 314 may utilize luma information from the pixel buffer 306 and/or other processing parameters. The temporary storage block 318 may comprise suitable logic, circuitry, and/or code that may be adapted to store temporary values determined by the BV MNR block 314. The MNR filter 316 may comprise suitable logic, circuitry, and/or code that may be adapted to determined a local variance parameter based on a portion of the image block being processed and to filter the portion of the image block being processed in accordance with the local variance parameter. The MNR filter 316 may also be adapted to determine a MNR difference parameter that may be utilized to reduce mosquito noise artifacts.

The HBNR block 308 may comprise suitable logic, circuitry, and/or code that may be adapted to determine a horizontal block noise reduction difference parameter for a current horizontal edge. The VBNR block 310 may comprise suitable logic, circuitry, and/or code that may be adapted to determine a vertical block noise reduction difference parameter for a current vertical edge.

The combiner 312 may comprise suitable logic, circuitry, and/or code that may be adapted to combine the original luma value of an image block pixel from the pixel buffer 306 with a luma value that results from the filtering operation performed by the MNR filter 316. The chroma delay 320 may comprise suitable logic, circuitry, and/or code that may be adapted to delay the transfer of chroma pixel information in the chroma data line to the VB XMT 322 to substantially match the time at which the luma data generated by the combiner 312 is transferred to the VB XMT 322. The VB XMT 322 may comprise suitable logic, circuitry, and/or code that may be adapted to assemble noise-reduced MPEG-coded video images into a format that is in accordance with the bus protocol supported by the VB.

Figure 4A:
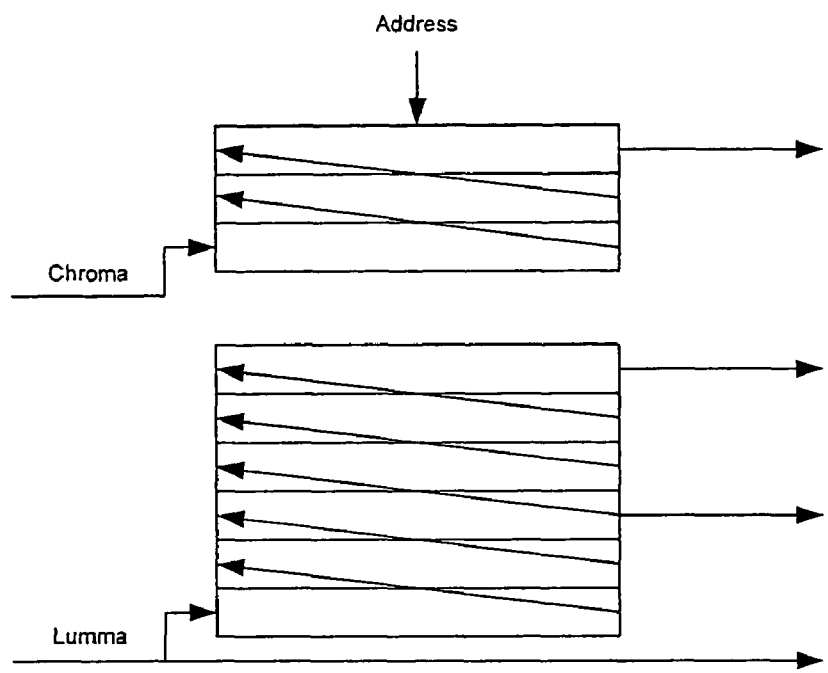
FIG. 4A illustrates an exemplary operation of line stores in a high definition (HD) mode, in accordance with an embodiment of the invention.

FIG. 4A illustrates an exemplary operation in a high definition (HD) mode, in accordance with an embodiment of the invention. Referring to FIG. 4A, the line stores block 304, described in FIG. 3, may be adapted to operate in a mode that converts HD image sources into output parallel lines. In this regard, the line stores block 304 may be adapted to generate three output parallel luma lines and one output chroma line, for example. The line stores block 304 may need to know the raster position relative to the image block boundaries. For example, the host processor 204 or a register DMA may provide offset values when a first raster pixel does not correspond to an image block boundary.

In one embodiment of the invention, the line stores block 304 may be implemented as a 768×72 memory with a single address. Both luma and chroma data may be wrapped from the output to the input as shown in FIG. 4A. In this regard, the luma data is expanded into three parallel lines and the chroma data is delay-matched by one line. For example, for a 1920× 1080i HD video signal, where i refers to interlaced video, the address may count modulo 640 and the data values may wrap around three times, or 3×640=1920. In another example, for a 1280×720p HD video signal, where p refers to progressive video, the address may count modulo 426 and the data values may wrap around three times, or 3×426=1278, with an error of two pixels. In this regard, additional registers and/or storage elements may be utilized for each line out to compensate for the error. The line stores block 304 may be adapted to process all picture sizes up to, for example, 1920 pixels width.

Figure 4B:
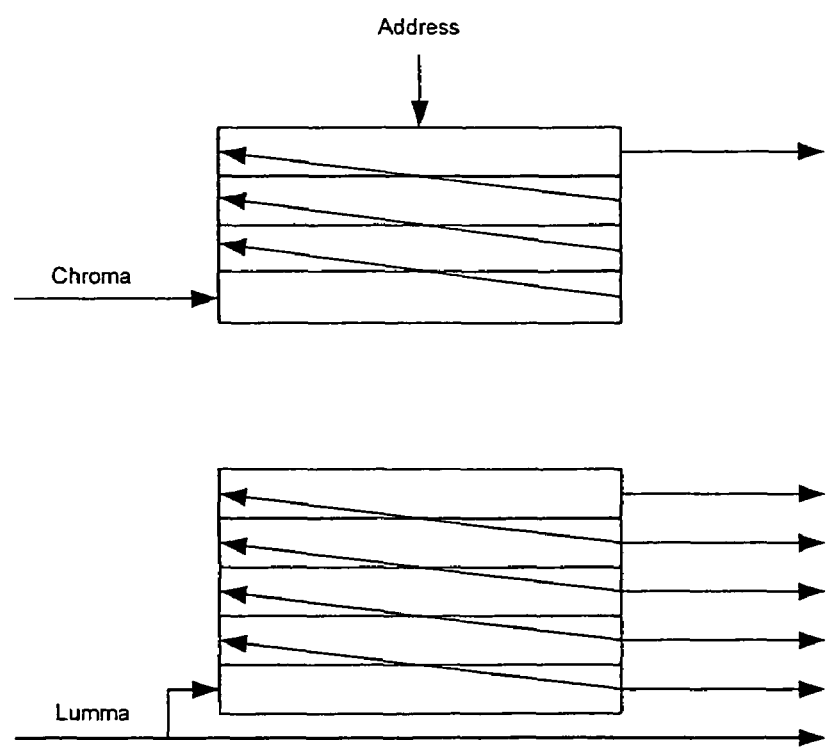
FIG. 4B illustrates an exemplary operation of line stores in a standard definition (SD) mode, in accordance with an embodiment of the invention.

FIG. 4B illustrates an exemplary operation in a standard definition (SD) mode, in accordance with an embodiment of the invention. Referring to FIG. 4B, the line stores block 304 described in FIG. 3 may be adapted to operate in a mode that converts SD image sources into output parallel lines. In this regard, the line stores block 304 may be adapted to generate six output parallel luma lines and one output chroma line, for example. The line stores block 304 may need to know the raster position relative to the image block boundaries. For example, the host processor 204 or a register DMA may provide offset values when a first raster pixel does not correspond to an image block boundary.

In one embodiment of the invention, the line stores block 304 may be implemented as a 768×72 memory with a single address. Both luma and chroma data may be wrapped from the output to the input as shown in FIG. 4B. In this regard, the luma data is expanded into six parallel lines and the chroma data is delay-matched by four lines. For example, for a 704× 480i SD video signal, where i refers to interlaced video, the address may count modulo 720 and the data values may not need to wrap around and produce an error of 16 pixels. In this regard, additional registers and/or storage elements may be utilized for each line out to compensate for the error. The line stores block 304 may be adapted to process all picture sizes up to, for example, 1920 pixels width.

The line stores block 304, whether operating in an HD mode or an SD mode, may also be adapted to provide line information, image block information, and/or pixel location information to the pixel buffer 306 and/or the chroma delay 320. For example, the line stores block 304 may indicate the position, location, and/or coordinates of a pixel in an 8×8 image block. The position, location, and/or coordinates may be adjusted based on any offset values. In another example, the line stores block 304 may indicate the start and/or end of an output line and/or the start and/or end of a current picture. Providing information to the pixel buffer 306 and/or the chroma delay 320 may be performed on a clock cycle basis, for example.

Figure 5:
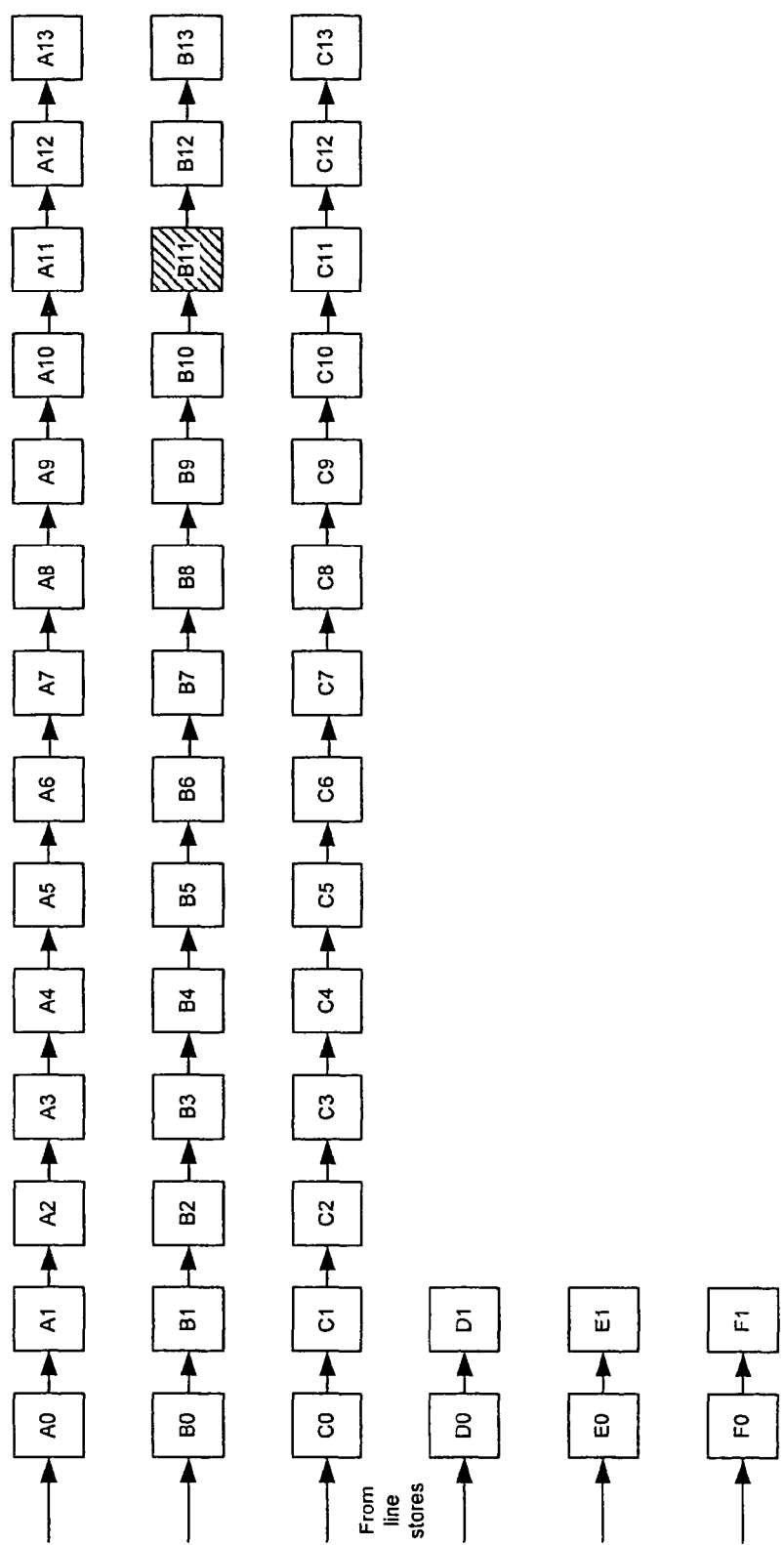
FIG. 5 illustrates an exemplary storage of line store luma output lines in the pixel buffer, in accordance with an embodiment of the invention.

FIG. 5 illustrates an exemplary storage of line store luma output lines in the pixel buffer, in accordance with an embodiment of the invention. Referring to FIG. 5, there is shown an exemplary organization of the stored luma output lines generated by the line stores block 304 in the pixel buffer 306 in FIG. 3. The topmost line of pixels labeled A0 through A13 may correspond to a previous output line. The line of pixels labeled B0 through B13 may correspond to a current output line. In this regard, the pixel labeled B11 may correspond to a current pixel being processed. When the line stores block 304 operates in an HD mode, the bottommost line of pixels to be processed may be the line of pixels labeled C0 through C13. When the line stores block 304 operates in an SD mode, the bottommost line of pixels to be processed may be the line of pixels labeled F0 through F1. In both cases the bottommost line of pixels may correspond to a next output line.

The lines of pixels labeled D0 through D1, E0 through E1, and F0 through F1 may be utilized for the SD mode of operation where six luma output lines may be generated by the line stores block 304 in FIG. 3. Moreover, two flops may be sufficient for handling these lines. Because pictures may be raster scanned from left to right, pixels in column 13, that is, pixels A13, B13, and C13, in the exemplary organization shown in FIG. 5 may correspond to the leftmost pixels in the pixel buffer 306 while pixels in column 0, that is, pixels A0, B0, and C0, may correspond to the rightmost pixels in the pixel buffer 306. In some instances, at least one of the register values as described in the exemplary organization shown in FIG. 5 may be removed to optimize the operation of the pixel buffer 306.

Figure 6:
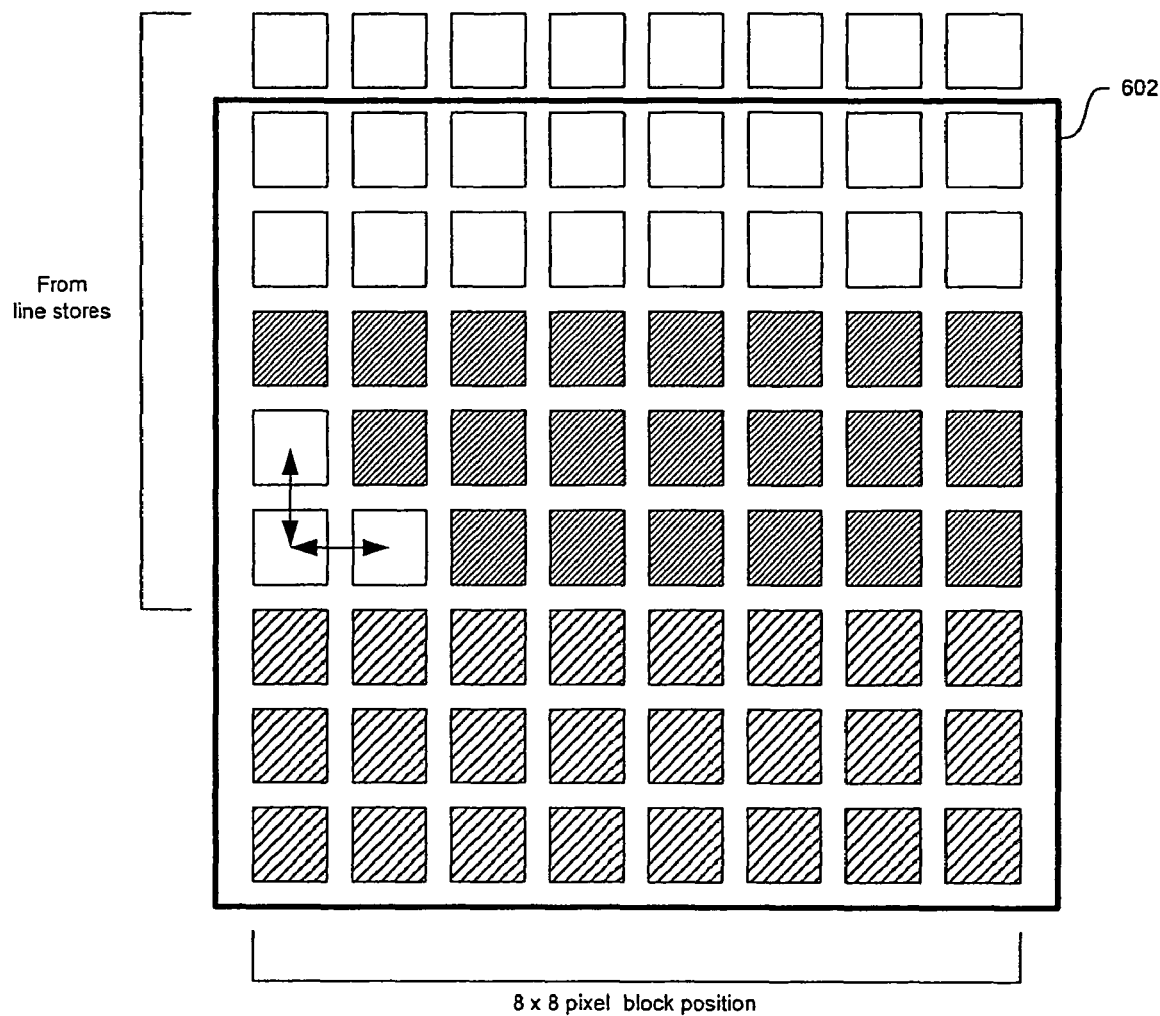
FIG. 6 illustrates exemplary contents in the pixel buffer for a current image block at an instant in time, in accordance with an embodiment of the invention.

FIG. 6 illustrates exemplary contents in the pixel buffer for a current image block at an instant in time, in accordance with an embodiment of the invention. Referring to FIG. 6, there is shown an image block 602 that comprises 64 pixel values. The top six lines of pixels may correspond to pixels in the pixel buffer 306 from the six luma output lines generated by the line stores block 304 when operating in a SD mode. The lower three lines of pixels shown by widely spaced hashed lines may correspond to subsequent luma output lines that have not been received by the pixel buffer 306. Pixel values in the pixel buffer 306 may be utilized to perform serial processing operations. For example, the arrows shown in FIG. 6 illustrate vertical and horizontal neighboring pixels as they shift through the pixel buffer 304. Because the pixels shown by narrowly spaced hashed lines may not be needed to perform serial processing operations, they may not need to be implemented in the pixel buffer 304.

Figure 7:
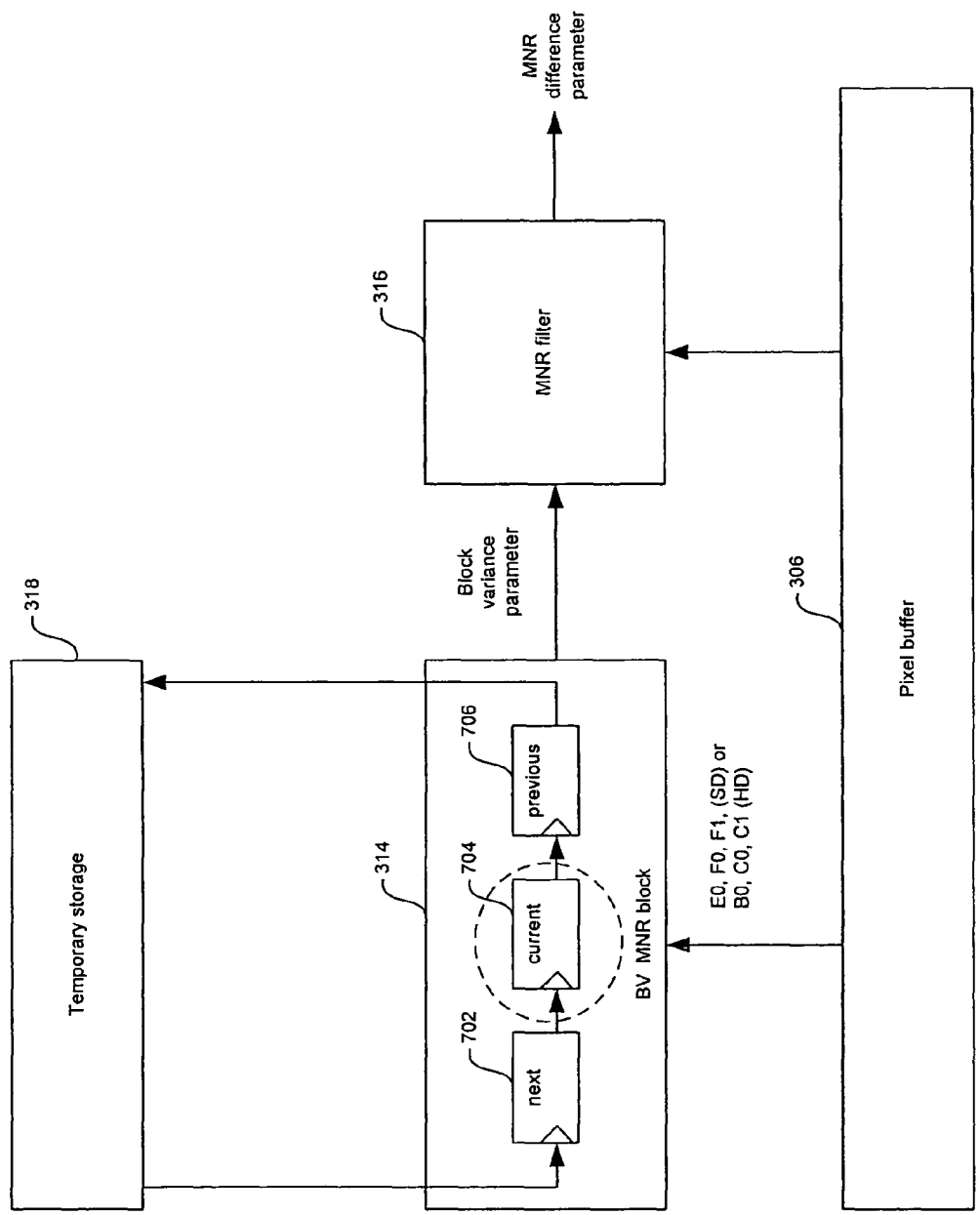
FIG. 7 is a block diagram illustrating an exemplary BV MNR block, in accordance with an embodiment of the invention.

FIG. 7 is a block diagram illustrating an exemplary BV MNR block and an exemplary MNR filter, in accordance with an embodiment of the invention. Referring to FIG. 7, there is shown the pixel buffer 306, the BV MNR block 314, the temporary storage block 318, and the MNR filter 316. The BV MNR 314 may comprise, for example, a next block 702, a current block 704, and a previous block 706.

The BV MNR block 314 may be adapted to perform luma edge detection within an image block and to determine a block variance parameter (block_var) based on the detected edges. In this regard, the length of the edge and/or the number of luma edges inside an image block may not determine the strength of the mosquito noise. For example, an image block with a single-pixel edge may have as much, or sometimes more, mosquito noise than an image block with an eight-pixel edge. However, the sharpness of the luma edge may determine the strength of the mosquito noise. For example, gently sloping contents in an image block may not generate mosquito noise.

The BV MNR block 314 may determine the block variance parameter by serially calculating and/or determining a horizontal variance parameter (h_var) and/or a vertical variance parameter (v_var). The value of h_var may correspond to the maximum left/right difference between neighboring pixels in an image block. The value of v_var may correspond to the maximum top/bottom difference between neighboring pixels in an image block. The values for h_var and v_var may be reset to a default value at the start of each block for SD pictures or may be scaled from previously determined values for HD pictures. In this regard, a reset default value may be zero. Referring to the pixel labels as shown in FIG. 5 for the pixel buffer 306, for SD pictures the horizontal and vertical variance parameter may be determined by:

$$h\_var = MAX(h\_var, abs(F0-F1)), \text{ and}$$

$$v\_var = MAX(v\_var, abs(E0-E0)),$$

where the values for h_var and v_var inside the MAX operations correspond to the maximum h_var and maximum v_var values previously determined for the image block respectively. For HD pictures the horizontal and vertical variance parameter may be determined by:

$$h\_var = MAX(h\_var, abs(C0-C1)), \text{ and}$$

$$v\_var = MAX(v\_var, abs(B0-C0)),$$

where the values for h_var and v_var inside the MAX operations correspond to the maximum h_var and maximum v_var values previously determined for the image block respectively. The determination of h_var and v_var may be performed serially and the pixels that correspond to the labels E0, F0, F1, B0, C0, and/or C1 may change as the data is shifted through the pixel buffer 306. The values of h_var and v_var may be calculated utilizing pixels within the image block. In this regard, the next block 702, the current block 704, and the previous block 796 in the BV MNR block 314 may be adapted to serially determine the h_var and v_var values for all columns in the picture by storing and/or receiving h_var and v_var values into the temporary storage 318.

Once the values for h_var and v_var have been determined for an entire image block, the block_var may be determined based on value proportional to the sum of h_var and v_var. For example, the value of the block variance parameter may be expressed by block_var=0.75*(h_var+v_var). In some instances, the values of h_var and v_var are based on only a portion of the image block because the pixel buffer 306 has not received all pixels that correspond to that image block. When all the pixels for an image block are not available, the block_var value may be determined based on current available values for v_var and h_var. When block_var is determined based on all the pixels in the image block it may be referred to as a complete block_var. When block_var is determined based on a portion of the pixels in the image block it may be referred to as a partial block_var. The BV MNR block 314 may transfer the value of block_var to the MNR filter 316. The MNR filter 316 may determine an MNR difference parameter based on the block_var value transferred from the BV MNR block 314.

Figure 8:
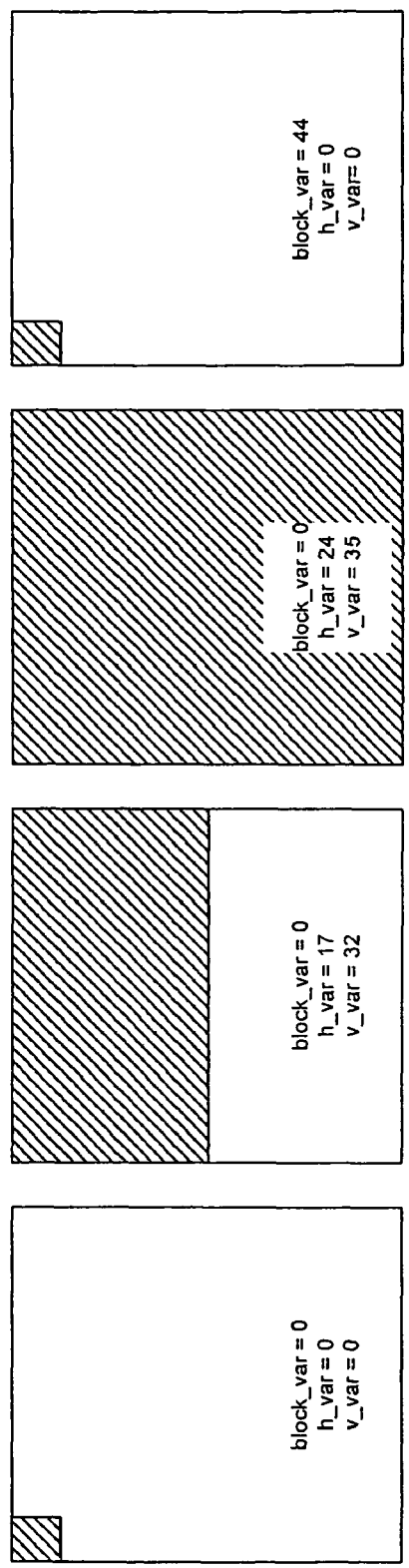
FIG. 8 illustrates exemplary block variance parameter values at various image block processing stages, in accordance with an embodiment of the invention.

FIG. 8 illustrates exemplary block variance parameter values at various image block processing stages, in accordance with an embodiment of the invention. Referring to FIG. 8, at a given time during the processing of an image block a different number of pixels may be available at the pixel buffer 306. For example, when few pixels are available, that is, when most of the pixels available are near the top of an image block, a partial or current block var may be determined based on the currently available values for h_var and v_var. When all the pixels in the image block are available, the complete block_var value may be determined based on the maximum left/right and maximum top/bottom differences between neighboring pixels for the entire image block.

The block_var stage described by the leftmost image block shown in FIG. 8 may correspond to a first stage when a first pixel in an current image block is being processed and all parameter values for the image block have been initialized and/or reset to zero. The current or partial block_var value for this first stage may be determined as block_var=0.75*(0+0)=0. The next image block shown in FIG. 8 may correspond to a second stage of the current image block when, as the current image block is raster scanned, values for h_var and v_var may be determined and may be stored in, for example, the temporary storage 318 in FIG. 3. In the exemplary second stage shown, the current value for h_var is 17 and the current value for v_var is 32. The value for the complete block_var remains at the reset value and the value for a current or partial block_var may be determined as block_var=0.75*(17+32)=37 with rounding.

The next image block shown in FIG. 8 may correspond to a third stage when the whole current image block has been scanned and the value for h_var is 24 and the value for v_var is 35. From these values the value of the current block_var for the entire current image block may be determined by block_var=0.75*(24+35)=44 with rounding. The value of the complete block_var remains at the reset value until replaced with the determined value of the current block_var. The next image block shown in FIG. 8 may correspond to a fourth stage when raster scanning of a next image block begins and the current value for h_var and current value for v_var are reset and the value for the complete block_var is the one determined for the current image block after the third stage was completed. In this regard, the next image block may refer to the next vertical image block in the column comprising the current image block. For the fourth stage, the value for a current or partial block_var may be determined as block_var=0.75*(0+0)=0.

Figure 9:
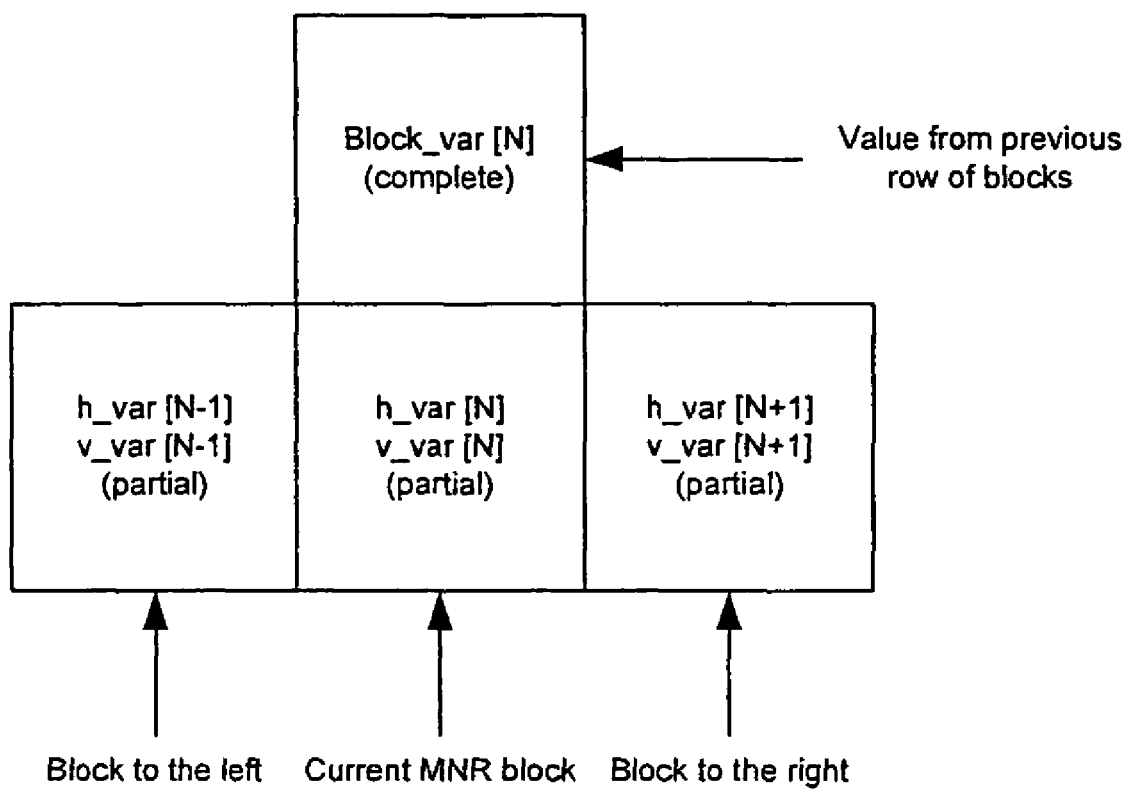
FIG. 9 illustrates exemplary use of neighboring image blocks when determining the block variance parameter, in accordance with an embodiment of the invention.

FIG. 9 illustrates exemplary use of neighboring image blocks when determining the block variance parameter, in accordance with an embodiment of the invention. Referring to FIG. 9, there is shown a current mosquito noise reduction (MNR) image block with adjacent image blocks in the same row or current image block row and an adjacent image block in the previous image block row. In some instances, luma edges may extend over a plurality of image blocks in a video picture. Because a previous image block row in the video picture may comprise information regarding at least one luma edge that may also extend into the current image block being processed, it may be useful to provide an approach that allows for this information to be considered in determining the block variance parameter of the current image block. Similarly, image blocks from the current image block row may comprise information regarding at least one luma edge that may also extend into the current image block being processed. In this regard, at least one image block to the right (N+1) and/or at least one image block to the left (N−1) of the current image block (N) in the current image block row may be considered, where N indicates the current image block column. Moreover, at least one image block in the previous image block row may also be considered.

When determining the block_var value for a current image block the block_var value for the image blocks in a previous image block row may have been determined already. In this regard, the current block_var for the current image block may correspond to a partial block_var when not all the pixels for the current image block are available from the pixel buffer 306 or may correspond to a complete block_var when all the pixels for the current image block are available from the pixel buffer 306. For a partial block_var value in the current image block, the effective block variance parameter for the current image block may be determined by the expression block_var=MAX[ block_var, block_var_left*m_merge/4, block_var_right*m_merge/4, block_var_top*m_merge/4].

where the block_var value inside the MAX operation corresponds to a partial block_var of the current image block, block_var_left corresponds to a partial block_var of the image block to the left of the current image block, block_var_right corresponds to the partial block_var of the image block to the right of the current image block, block_var_top corresponds to a partial block_var of the image block on top of the current image block, m_merge corresponds to a mosquito noise merge parameter, and the number 4 is an exemplary scaling factor. The value of m_merge may range from 0 to 4, for example and may be programmable.

For a complete block_var value in the current image block, the effective block variance parameter for the current image block may be determined by the expression block_var=MAX[ block_var, block_var_left*m_merge/4, block_var_right*m_merge/4], where the block_var value inside the MAX operation corresponds to a complete block_var of the current image block, block_var_left corresponds to a complete block_var of the image block to the left of the current image block, block_var_right corresponds to a complete block_var of the image block to the right of the current image block, m_merge corresponds to the mosquito noise merge parameter, and the number 4 is an exemplary scaling factor.

The approach described in relation to FIG. 9 may not be limited to image blocks immediately on top to the current image block but may be extended to a plurality of image blocks in a plurality of previous image block rows. Similarly, the approach may not be limited to the image blocks immediately to the left and/or to the right of the current image block but may be extended to a plurality of image blocks to the left and/or a plurality of image blocks to the right of the current image block in the current image block row.

Figure 10:
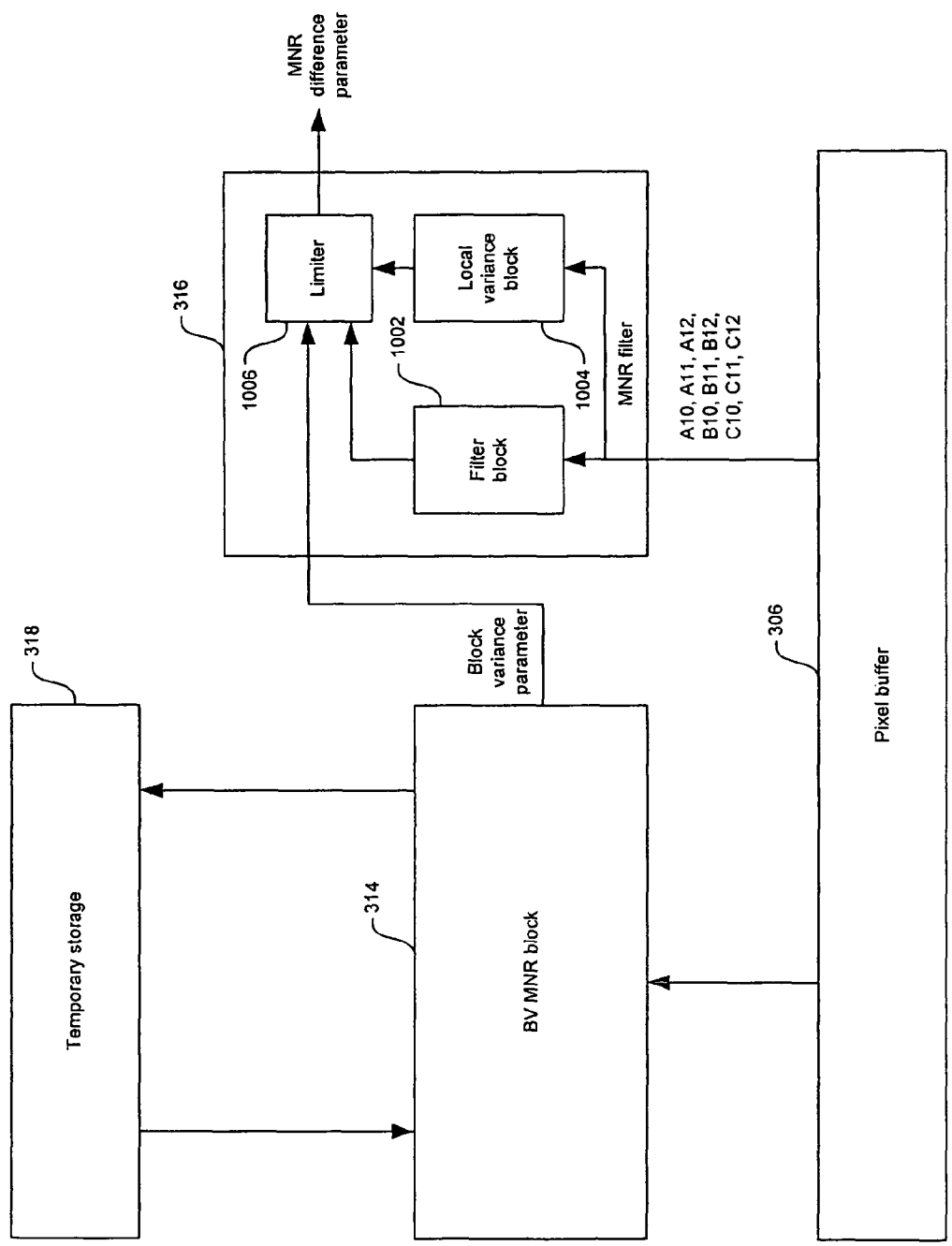
FIG. 10 is a block diagram illustrating an exemplary MNR filter block, in accordance with an embodiment of the invention.

FIG. 10 is a block diagram illustrating an exemplary MNR filter block, in accordance with an embodiment of the invention. Referring to FIG. 10, there is shown the pixel buffer 306, the BV MNR block 314, the temporary storage block 318, and the MNR filter 316. The MNR filter 316 may comprise, for example, a filter block 1002, a local variance block 1004, and a limiter 1006. The filter block 1002 may comprise suitable logic, circuitry, and/or code that may be adapted to filter a portion of the image block. In this regard, the portion of the image block to be filtered may correspond to the pixels A10, A11, A12, B10, B11, B12, C10, C11, and C12 the pixel buffer 306 as described in FIG. 5. The pixel labeled B11 may correspond to the current pixel being processed for which mosquito noise artifacts may be reduced. Filtering may be performed on completed image blocks. In some instances, when an image block corresponds to the video picture boundary, filtering may not be performed on that image block. The set of filter values to be utilized may depend on whether the video signal is progressive or interlaced.

The local variance block 1004 may comprise suitable logic, circuitry, and/or code that may be adapted to determine a local variance parameter (local_var) in a portion of the image block. In this regard, the local variance parameter may be determined based on the portion of the image block that corresponds to the pixels A10, A11, A12, B10, B11, B12, C10, C11, and C12 the pixel buffer 306 as described in FIG. 5. The pixel labeled B11 may correspond to the current pixel being processed for which mosquito noise artifacts may be reduced.

The limiter 1006 may comprise suitable logic, circuitry, and/or code that may be adapted to determine the MNR difference parameter based on an original pixel value from the pixel buffer 306, a filtered pixel value from the filter block 1008, a relative weight parameter (m_rel), the block_var from the BV MNR block 314, and the local_var from the local variance block 1010. Once determined, the MNR difference parameter for a current pixel being processed may be transferred to the combiner 312 in FIG. 3.

Figures 11A, 11B:
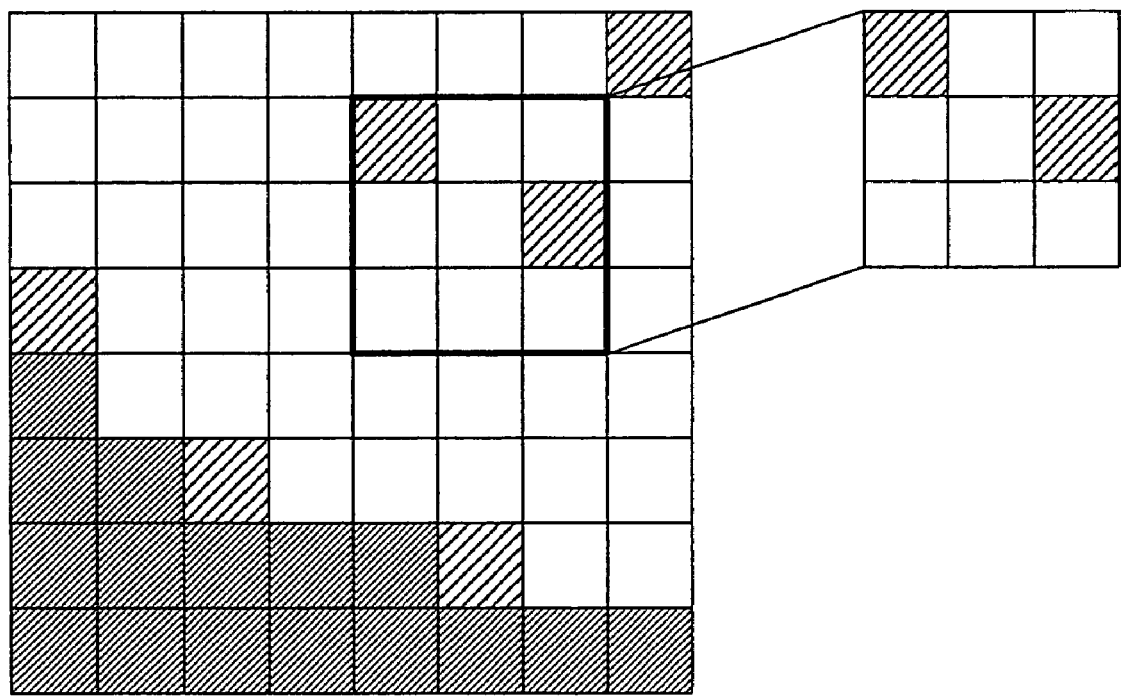
FIGS. 11A-11B illustrate an exemplary portion of the current image block for determining a local variance parameter, in accordance with an embodiment of the invention.

FIGS. 11A-11B illustrate an exemplary portion of the current image block for determining a local variance parameter, in accordance with an embodiment of the invention. Referring to FIG. 11A, there is shown a plurality of narrowly spaced hashed pixels that may correspond to a luma edge in the lower left corner of the image block. The widely spaced hashed pixels may correspond to mosquito noise artifacts that may occur in the image block as a result of MPEG coding, for example. The inset shown may correspond to a current portion of the image block being processed by the MNR filter 316. Referring to FIG. 11B, there is shown the pixel labels in the pixel buffer 306 that correspond to the pixels in the current portion of the image block shown in the inset in FIG. 11A. In this regard, the pixel labeled B11 may correspond to the current pixel for which mosquito noise artifacts may be reduced.

When determining the local variance parameter in the local variance block 1004, a local maximum and a local minimum may be determined for the portion of the image block shown in FIG. 11B. For example, the local maximum may be determined by the expression local_max=MAX[A10, A11, A12, B10, B11, B12, C10, C11, C12], while the local minimum may be determined by the expression local_min=MIN[A10, A11, A12, B10, B11, B12, C10, C11, C12].

The value of local_var may be determined as follows:

```
if ( (spot_size_reduction) && (local_max < B11) ||
    (local_min > B11) ) {
        local_var = local_max – local_min }
otherwise {
        local_var = MIN[local_max – B11, B11 – local_min ] },
``` where spot_size_reduction may correspond to a constraint parameter.

The filter block 1002 may be adapted to utilize a different set of values or filter coefficients when filtering interlaced and when filtering progressive content. For example, for progressive video images, the filter block 1002 may utilize the following filter coefficients (5, 8, 5, 8, 12, 8, 5, 8, 5)/64, where 64 is an exemplary scaling factor. In another example, for interlaced video images, the filter block 1002 may utilize the following filter coefficients (3, 6, 3, 12, 16, 12, 3, 6, 3)/64, where 64 is an exemplary scaling factor. The filter block 1002 may determine the filtered pixel values for the pixels in the image block and may transfer those values to the limiter 1004 for further processing.

The limiter 1006 may be adapted to determine a clamping limit (limit) to apply to a difference parameter that results from the original pixel value from the pixel buffer 306 and the filtered pixel value from the MNR filter block 1002. The clamping limit may be determined as follows:

$$\begin{aligned}&\text{limit} = \text{block\_var} - (\text{m\_rel} * \text{local\_var} + 2)/4, \\ &\text{if (block\_var} < \text{m\_core}) \{ \\ &\quad \text{limit} = \text{limit} + (\text{m\_core} - \text{block\_var}) \} \\ &\text{if (limit} < 0 )\{ \\ &\quad \text{limit} = 0 \},\end{aligned}$$

where m_core corresponds to a mosquito core limit parameter and block_var may correspond to the block variance parameter determined based on adjacent image blocks. The value of m_rel may depend on the relative weight to be given to the local_var in relation to the block_var. The value of m_rel may be determined based on at least a portion of the video signal information received by the DNR block 208 from the host processor 204. The value of m_core provides a threshold for at least partial removal of mosquito noise.

The limiter 1006 may also be adapted to determine a difference parameter (diff) that results from subtracting the original pixel value (orig_pixel) from the filtered pixel value (filt_pixel) determined by the filter block 1002. Once the value of diff has been determined, the limiter 1006 may determine the MNR difference parameter (MNR_diff) based on the following expression $$\text{MNR\_diff} = \text{CLAMP}(\text{filt\_pixel} - \text{orig\_pixel}, -\text{limit}, +\text{limit})$$
$$= \text{CLAMP}(\text{diff}, -\text{limit}, +\text{limit}),$$

where the CLAMP operation limits the value of diff to a lower value given by −limit and to an upper value given by +limit. The value of MNR_diff may then be transferred to the combiner 312.

Figure 12:
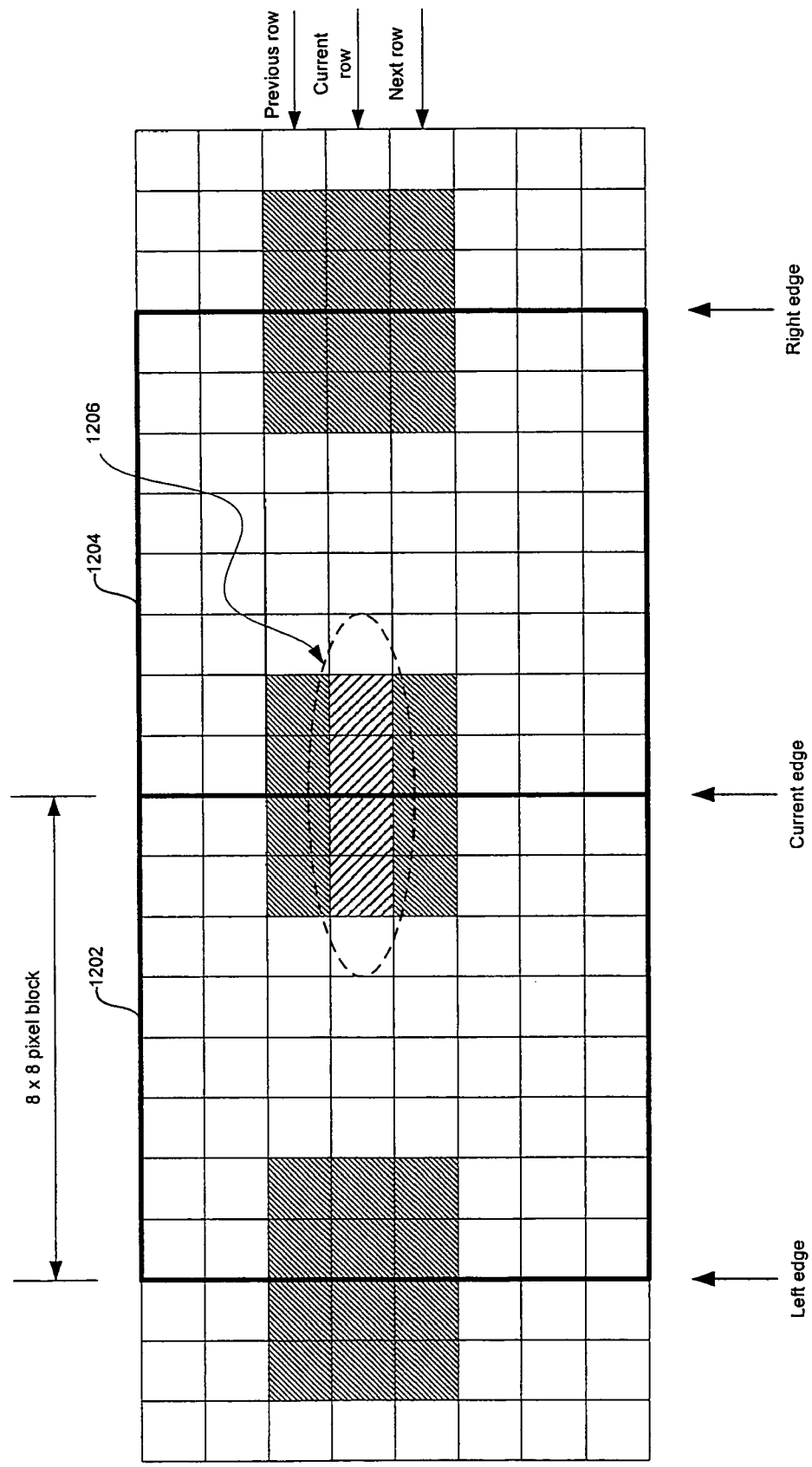
FIG. 12 illustrates exemplary vertical edge detection region for block noise reduction, in accordance with an embodiment of the invention.

FIG. 12 illustrates exemplary vertical edge detection region for block noise reduction, in accordance with an embodiment of the invention. Referring to FIG. 12, there is shown a first image block 1202 adjacent to a second image block 1204 in a video image. The image blocks shown may comprise, for example, an 8×8 array of pixels. The left vertical border of image block 1202 may correspond to a left vertical edge for block noise reduction processing. The right vertical border of image block 1202, which corresponds to the left vertical border of image block 1204, may correspond to a current vertical edge for block noise reduction processing. The right vertical border of image block 1204 may correspond to a right vertical edge for block noise reduction processing. Any of the current vertical edge, the left vertical edge, or the right vertical edge may also be referred to as a vertical edge. Edge-related parameters may be determined for each of the vertical edges and may be utilized to determine whether the vertical edge that coincides with the current vertical edge may be a result of blocking artifacts.

When determining edge-related parameters for any one of the vertical edges, a portion of the image comprising pixels neighboring the vertical edge may be utilized. These neighboring pixels may include a plurality of pixels to the left and to the right of the selected vertical edge. For example, as shown in FIG. 12, twelve pixels may be utilized per vertical edge. The twelve pixels are shown as narrowly spaced hashed lined pixels for either the left vertical edge or the right vertical edge. The twelve pixels are shown as eight narrowly-spaced hashed lined pixels in the previous and the next row of pixels for the current vertical edge and four widely-spaced hashed lined pixels in the current row of pixels for the current vertical edge. The twelve pixels may correspond to two pixels to the left and two pixels to the right of the vertical edge in a previous row of pixels, two pixels to the left and two pixels to the right in a current row of pixels, and two pixels to the left and two pixels to the right of the vertical edge in a next row of pixels. The number of pixels for determining edge parameters may depend on the application and/or the available memory in the DNR block 208 in FIG. 2. In this regard, more or fewer than twelve pixels may be utilized and more or fewer than three rows of pixels may be utilized when determining edge parameters. After determining the edge parameters, the widely spaced hashed-lined pixels in the current row of pixels for the current vertical edge may be further processed to reduce artifacts that may be related to block noise.

Figure 13A:
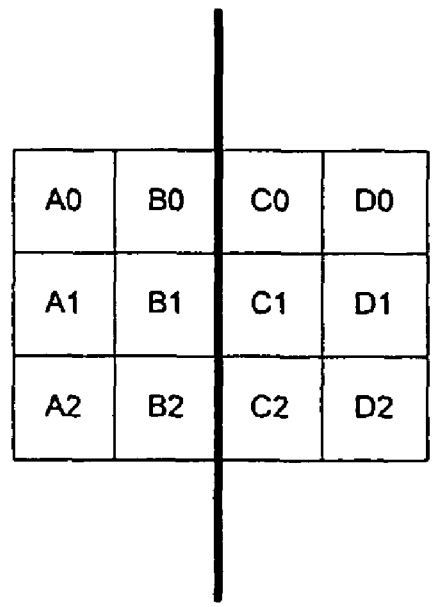
FIG. 13A illustrates an exemplary image portion for edge variance determination, in accordance with an embodiment of the invention.

FIG. 13A illustrates an exemplary image portion for edge variance determination, in accordance with an embodiment of the invention. Referring to FIG. 13A, the pixels for determining a plurality of edge-related parameters for a vertical edge may be labeled A0, B0, C0, and D0 for the previous row of pixels, A1, B1, C1, and D1 for the current row of pixels, and A2, B2, C2, and D2 for the next row of pixels. A vertical edge variance parameter for the vertical edge being processed may be determined by utilizing, for example, the following expression:

$$\text{edge\_var} = \text{ABS}(B0-C0) + \text{ABS}(B1-C1) + \text{ABS}(B2-C2),$$

where ABS corresponds to an absolute value operation. A background variance parameter for the image portion defined in FIG. 13A may be determined by utilizing, for example, the following expression:

$$\text{backgnd\_var} = \text{MAX}[(\text{ABS}(A0-B0) + \text{ABS}(A1-B1) + \text{ABS}(A2-B2)),$$

$$(\text{ABS}(C0+D0) + \text{ABS}(C1-D1) + \text{ABS}(C2-D2))]$$

where the first value in the MAX operation corresponds to a left vertical variance parameter and the second value in the MAX operation corresponds to a right vertical variance parameter.

A first edge strength parameter (edge_strength) and a second edge strength parameter (edge_strength2) may be determined based on the edge variance parameter and the background variance parameter. For example, the first and second edge strength parameters may be determined as follows:

$$\text{edge\_stength} = \text{edge\_var} - b\_\text{ref} * \text{backgnd\_var}/4,$$

$$\text{edge\_strength2} = \text{edge\_var} - 2 * b\_\text{rel} * \text{backgnd\_var}/4,$$

where b_rel is a relative weight parameter that may be utilized to control the variance of the edge relative to the background and 4 may correspond to an exemplary scaling factor. In this regard, the value of b_rel may be part of and/or may be determined from the video signal information received by the DNR block 208 in FIG. 2. For example, smaller values of b_rel may result in stronger edge strengths and may allow for more filtering.

For each vertical edge, a maximum vertical parameter may be determined by the following exemplary expression:

$$\text{vert\_max}=\text{MAX}[\text{ABS}(B0-C0), \text{ABS}(B1-C1), \text{ABS}(B2-C2)].$$

Moreover, a first vertical edge clamping limit (limit) and a second vertical edge clamping limit (limit2) may be determined for every vertical edge based on edge strength values, the maximum vertical parameter, and a block core limit (b_core). The value of b_core may be determined so as to prevent filtering of very strong edge that are likely to be the result of image content. Exemplary expressions for determining the first and second vertical edge clamping limit may be as follows:

$$\text{limit}=\text{MIN}[\text{edge\_strength}, (b\_\text{core}-\text{vert\_max})],$$

$$\text{limit2}=\text{MIN}[\text{edge\_strength2}, (b\_\text{core}-\text{vert\_max})].$$

The value of b_core may be part of and/or may be determined from the video signal information received by the DNR block 208 in FIG. 2. For example, larger values of b_core may allow filtering of stronger edges. The values for limit and limit2 may be determined for the current vertical edge, for the left vertical edge, and/or for the right vertical edge. In this regard, the limits for the current vertical edge may be referred to as current vertical edge clamping limits, the limits for the left vertical edge may be referred to as left vertical edge clamping limits, and the limits for the right vertical edge may be referred to as right vertical edge clamping limits.

The clamping limits for the current vertical edge, the left vertical edge, and the right vertical edge may be combined to provide a first vertical combined clamping limit (combined_limit) based on the values of limit for the vertical edges and a second vertical combined clamping limit (combined_limit2) based on the values of limit2 for the vertical edges. In this regard, the first and second vertical combined clamping limits may be utilized for processing the widely-spaced hashed-lined pixels in the current row of pixels for the current vertical edge as shown in FIG. 12. The values of combined_limit and combined_limit2 may be determined by the following exemplary expressions:

$$\text{temp}=\text{MAX}[\text{limit\_left}, \text{limit\_right}]+b\_\text{core}/8,$$

$$\text{temp2}=\text{MAX}[\text{limit2\_left}, \text{limit2\_right}]+b\_\text{core}/8,$$

if (temp<lower_limit) {temp=lower_limit} if (tepm2<lower_limit2) {temp2=lower_limit2}

$$\text{combined\_limit}=\text{MIN}(\text{temp}, \text{limit\_current}),$$

$$\text{combined\_limit2}=\text{MIN}(\text{temp2}, \text{limit\_current2}),$$

where temp corresponds to a temporary variable for storing the maximum of the first left vertical edge clamping limit (limit_left) and the first right vertical edge clamping limit (limit_right), temp2 corresponds to a temporary variable for storing the maximum of the second left vertical edge clamping limit (limit_left2) and the second right vertical edge clamping limit (limit_right2), lower_limit and lower_limit2 may correspond to lower limits that may be allowed for temp and temp2 respectively, MIN corresponds to a minimum value operation, limit_current corresponds to the first current vertical edge clamping limit, limit_current2 corresponds to the second current vertical edge clamping limit, and 8 is an exemplary scaling factor. The values of lower_limit and lower_limit2 may be selected to, for example, avoid negative vertical combined clamping limit values.

Figure 13B:
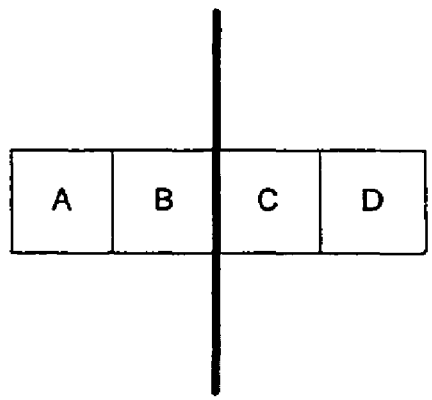
FIG. 13B illustrates an exemplary notation that may be utilized for vertical edge filtering, in accordance with an embodiment of the invention.

FIG. 13B illustrates an exemplary notation that may be utilized for vertical edge filtering, in accordance with an embodiment of the invention. Referring to FIG. 13B, there is shown pixels labeled A, B, C, and D that are located in a current row of pixels in the current vertical edge. In this regard, the pixel labeled B is located to the left of the current vertical edge and the pixel A is located to the left of the pixel labeled B. Similarly, the pixel labeled C is located to the right of the current vertical edge and the pixel labeled D is located to the right of the pixel labeled C.

The values of the pixels labeled A, B, C, and D may be filtered and the new filtered values A', B', C', and D' may be given as:

$$A'=(13A+3C+8)/16,$$

$$B'=(10B+6C+8)/16,$$

$$C'=(6B+10C+8)/16, \text{ and}$$

$$D'=(3B+13D+8)/16.$$

A difference parameter may be determined based on an original pixel value (original_pix) and a filtered pixel value (filt_pix). For example, the difference parameter may be determined by:

$$\text{diff}=\text{filt\_pix}-\text{original\_pix}.$$

A vertical block noise reduction difference parameter (VBNR_diff) may be determined based on the difference parameter and the clamping limits. An exemplary VBNR_diff may be determined as follows:

```
if (pixel position corresponds to pixel labeled A or D)
    { VBNR_diff = CLAMP(diff, -combined_limit2,
      +combined_limit2) }
else if (pixel position correspond to pixel labeled B or C)
    { VBNR_diff = CLAMP(diff, -combined_limit,
      +combined_limit) }
else
    { VBNR_diff = 0 }
``` where CLAMP may correspond to a clamping or limiting operation. Limiting the filtering operation may be performed to ensure that strong vertical edges may be filtered while very strong vertical edges may not be filtered since they may correspond to image content. The limits may be soft and may have gradual turn-offs. Edges that occur in relatively flat backgrounds may affect all of the pixels labeled A, B, C, and D. However, the when noisier backgrounds occur, the filtering may be limited so that only the pixels labeled B and C may be adjusted.

Figure 14:
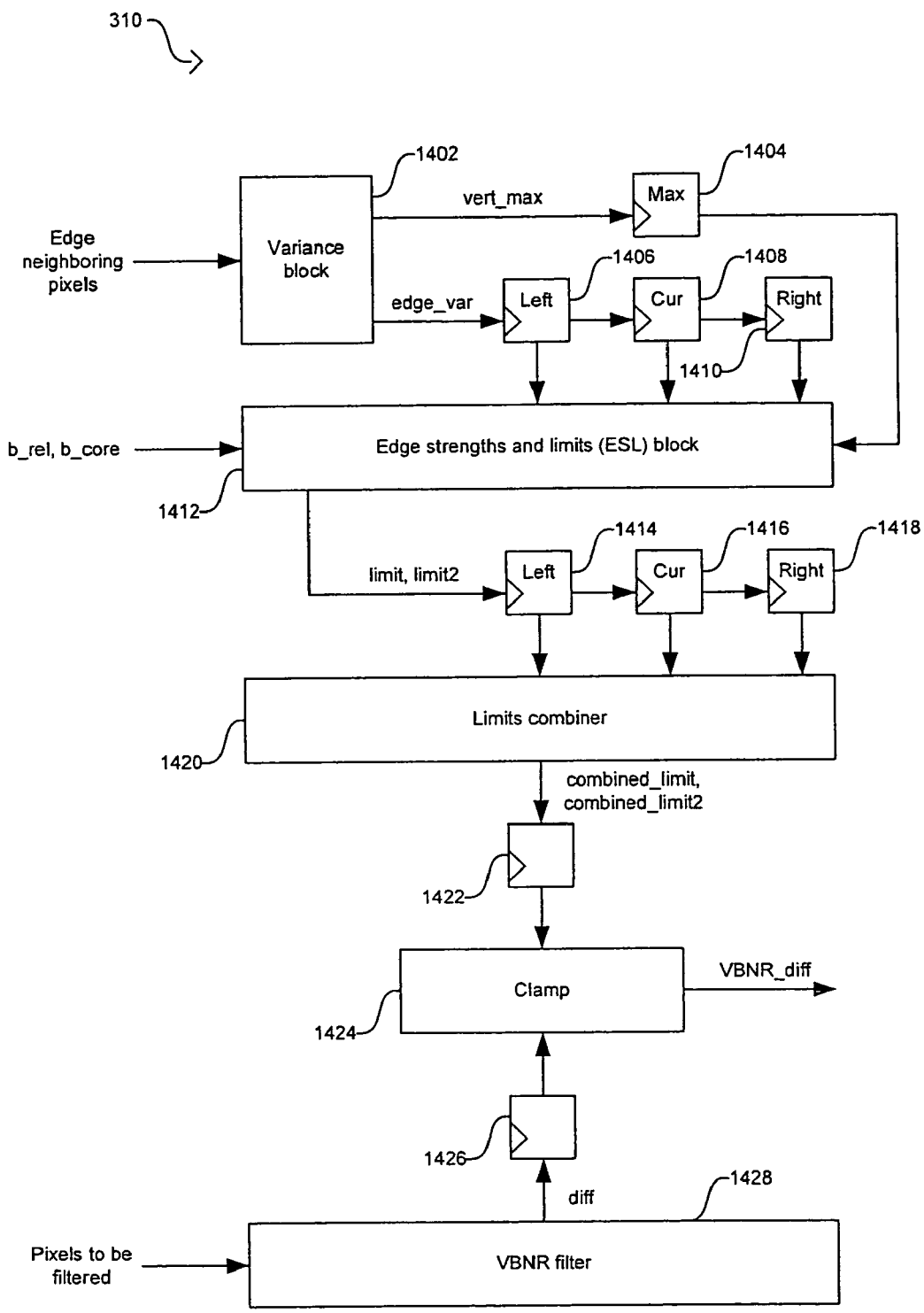
FIG. 14 is a block diagram of an exemplary vertical BNR block, in accordance with an embodiment of the invention.

FIG. 14 is a block diagram of an exemplary vertical BNR block, in accordance with an embodiment of the invention. Referring to FIG. 14, the VBNR block 310 in FIG. 3 may comprise a variance block 1402, a max latch 1404, a left latch 1406, a current latch 1408, a right latch 1410, an edge strengths and limits (ESL) block 1412, a left latch 1414, a current latch 1416, a right latch 1418, a limits combiner 1420, a latch 1422, a clamping block 1424, a latch 1426, and a vertical block noise reduction (VBNR) filter 1428.

The variance block 1402 may comprise suitable logic, circuitry, and/or code that may be adapted to determine a vertical edge variance parameter (edge_var) and a maximum vertical parameter (vert_max) for a vertical edge being processed. The max latch 1404, the left latch 1406, the current latch 1408, the right latch 1410, the left latch 1414, the current latch 1416, the right latch 1418, the latch 1422, and the latch 1426 may comprise suitable logic and/or circuitry that may be adapted to store information. The variance block 1402 may transfer the value of vert_max to the max latch 1404 and the value of edge_var to the left latch 1406. The value in left latch 1406 may be transferred to current latch 1408 and then from the current latch 1408 to the right latch 1410. For example, after three clock cycles the variance block 1402 may have determined the edge_var and vert_max values for a current vertical edge, a left vertical edge, and a right vertical edge.

The ESL block 1412 may comprise suitable logic, circuitry, and/or code that may be adapted to receive the vertical edge variance parameters and the maximum vertical parameters for the current vertical edge, the left vertical edge, and the right vertical edge and determine the edge strength parameters (edge_strength, edge_strength2) and the vertical edge clamping limits (limit, limit2) for each of these vertical edges. In this regard, the ESL block 1412 may utilize the relative weight parameter (b_rel) and/or the block core limit (b_core) during processing. The ESL block 1412 may transfer the values for the vertical edge clamping limits to the left latch 1414. The value in the left latch 1414 may be transferred to the current latch 1416 and then from the current latch 1416 to the right latch 1418. The limits combiner 1420 may comprise suitable logic, circuitry, and/or code that may be adapted to receive the right vertical edge clamping limits, the current vertical edge clamping limits, and the right vertical edge clamping limits and determine the first vertical combined clamping limit (combined_limit) and the second vertical combined clamping limit (combined_limit2) to be utilized with the pixels labeled A, B, C, and D in FIG. 7B. The limits combiner 1420 may be adapted to transfer the values for combined_limit and combined_limit2 to the latch 1422. The latch 1422 may be adapted to transfer the values of combined_limit and combined_limit2 to the clamping block 1424.

The VBNR filter 1428 may comprise suitable logic, circuitry, and/or code that may be adapted to filter the original values of the pixels labeled A, B, C, and D in FIG. 13B and to determine a difference parameter (diff) based on the original and filtered values. The values of the filter coefficients utilized by the VBNR filter 1428 may be programmable via, for example, the host processor 204 and/or via a register direct memory access (DMA). The VBNR filter 1428 may be adapted to transfer the value of the difference parameter to the latch 1426. The latch 1426 may be adapted to transfer the value of the difference parameter to the clamping block 1424. The clamping block 1424 may comprise suitable logic, circuitry, and/or code that may be adapted to determine the vertical block noise reduction difference parameter (VBNR_diff) based on the values of combined_limit, combined_limit2, and diff. In this regard, the clamping block 824 may clamp or limit the value of the difference parameter based on the value of combined_limit when processing the pixels labeled B or C in FIG. 13B. Moreover, the clamping block 1424 may clamp or limit the value of the difference parameter based on the value of combined_limit2 when processing the pixels labeled A or D in FIG. 13B. The clamping block 1424 may be adapted to transfer the value of VBNR_diff to the combiner 312 in FIG. 3.

When processing the first and last vertical edges in a video image, that is, the picture border or boundary, filtering may not be utilized. In this regard, the vertical combined edge clamping limits may be set to zero, for example. When processing the next to the first and next to the last vertical edges in a video image, the values of temp and temp2 may be set to b_core/4, for example.

Figure 15A:
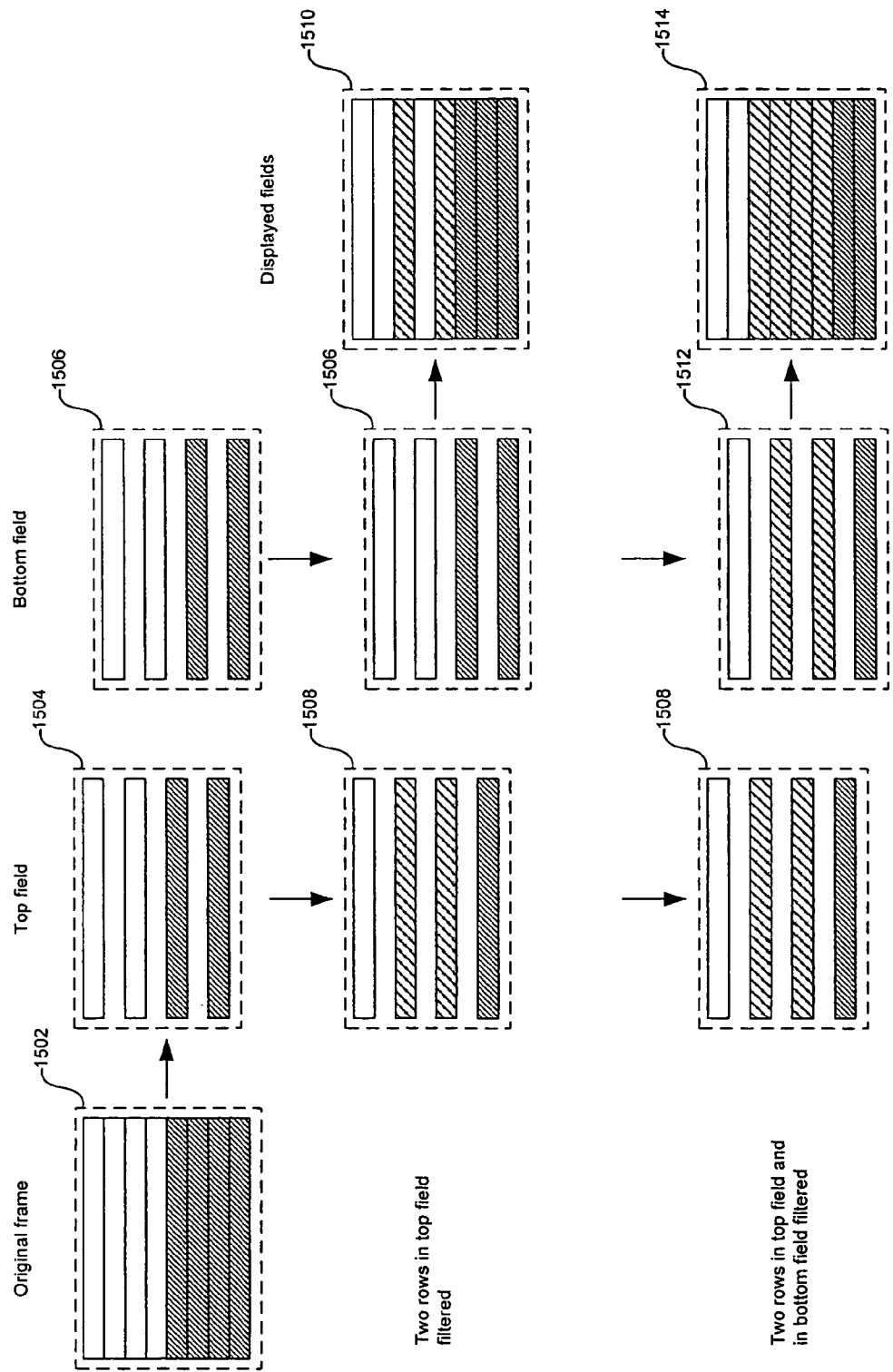
FIG. 15A illustrates exemplary problems that may be associated with horizontal edge filtering in interlaced video, in connection with an embodiment of the invention.

FIG. 15A illustrates exemplary problems that may be associated with horizontal edge filtering in interlaced video, in connection with an embodiment of the invention. Referring to FIG. 15A, there is shown an original frame 1502 of a video image comprising eight rows of pixels. The white shaded rows of pixels and the narrowly spaced hashed lined rows of pixels result in a horizontal edge being detected between the white shaded portion of the video image and the narrowly spaced hashed lined portion of the video image. The top field 1504 of the frame comprises two of the white shaded rows of pixels and two of the narrowly spaced hashed lined rows of pixels from the frame. The bottom field 1506 of the frame comprises the two remaining white shaded rows of pixels and the two remaining narrowly spaced hashed lined shaded rows of pixels from the frame.

When considering the top field 1504, a horizontal edge may be detected between the second row from the top and the third row from the top. When considering the bottom field 1506, a horizontal edge may be detected between the second row from the top and the third row from the top. In some instances, only the top field may be filtered and the values of at least a portion of the pixels in the second and third row from the top in the top field may change to reduce block noise. The filtered rows of pixels in a filtered top field 1508 are shown as widely spaced hashed lined rows of pixels. When the filtered top field 1508 and the bottom field 1506 are displayed, a hanging row may occur as shown in filtered frame 1510 and the effect of reducing block noise may not provide a visually pleasing experience for a viewer. In other instances, the top and bottom fields may be filtered and the values of at least a portion of the pixels in the second and third row from the top for both the top field 1504 and the bottom field 1506 may change. The filtered rows of pixels in the filtered top field 908 and a filtered bottom field 1512 are shown as widely spaced hashed lined rows of pixels. When the filtered top field 1508 and the filtered bottom field 1512 are displayed, the effects of reducing block noise may be spread over four rows of pixels as shown in filtered frame 1514 and may not provide a visually pleasing experience for a viewer.

There may be some differences between the presence of horizontal edges and vertical edges that result from block noise. For example, the horizontal edges may be generally less noticeable. The horizontal edges may be more difficult to process in interlaced video. The horizontal edges may require line stores to detect and filter.

Figure 15B:
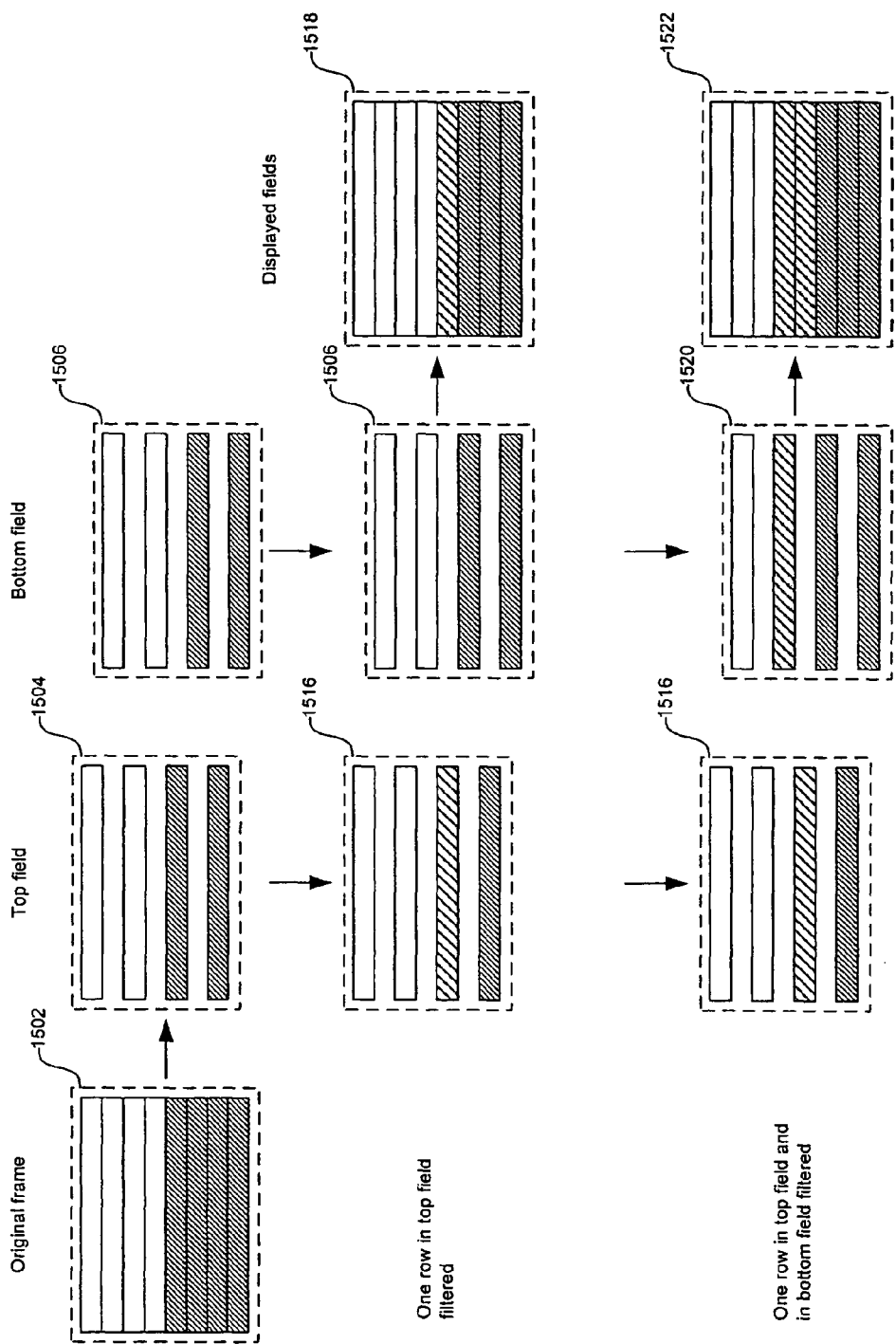
FIG. 15B illustrates exemplary horizontal edge filtering for interlaced video, in accordance with an embodiment of the invention.

FIG. 15B illustrates exemplary horizontal edge filtering for interlaced video, in accordance with an embodiment of the invention. Referring to FIG. 15B, there is shown the original frame 1502 of video image as in FIG. 15A. In this exemplary approach, when considering the top field 1504, a horizontal edge may be detected between the second row from the top and the third row from the top. When considering the bottom field 1506, a horizontal edge may be detected between the second row from the top and the third row from the top.

In some instances, only the top field 1504 may be filtered and the values of at least a portion of the pixels in the third row from the top in the top field 1504 may change to reduce block noise. The filtered rows of pixels in the filtered top field 1516 are shown as widely spaced hashed lined rows of pixels. When the filtered top field 1516 and the bottom field 1506 are displayed, no hanging row occurs as shown in filtered frame 1518 and the effect of reducing block noise may provide a more visually pleasing experience for a viewer. In other instances, the top and bottom fields may be filtered and the values of at least a portion of the pixels in the third row from the top for both the top field 1504 and the values of at least a portion of the pixels in the second row from the top for the bottom field 1506 may change. The filtered rows of pixels are shown as widely spaced hashed lined rows of pixels in the filtered top field 1516 and the filtered bottom field 1520. When the filtered top field 1516 and the filtered bottom field 1520 are displayed, the effects of reducing block noise may be spread over only two rows of pixels as shown in the filtered frame 1522 and may provide a more visually pleasing experience for a viewer. In this regard, filtering may be performed with 2-tap filters and/or smaller limits.

Figure 16A:
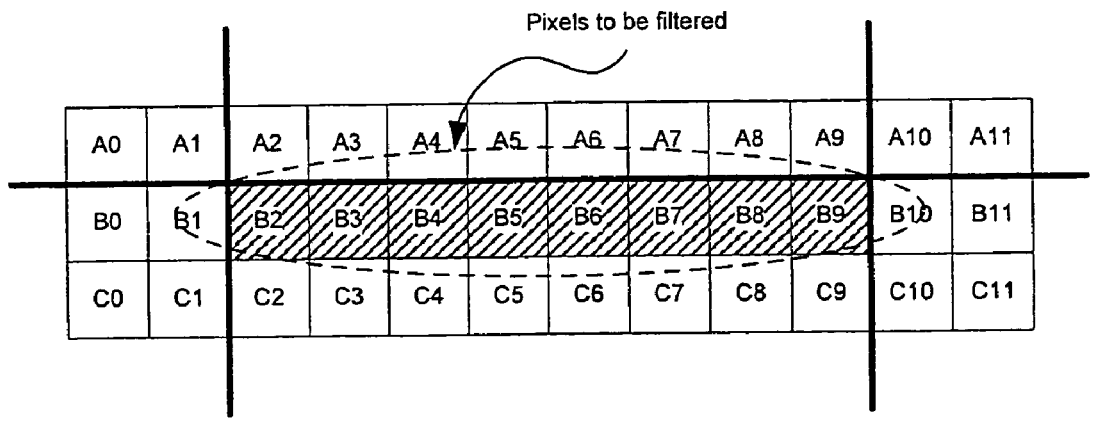
FIGS. 16A-16C illustrate exemplary vertical and/or horizontal detection, in accordance with an embodiment of the invention.
Figure 16B:
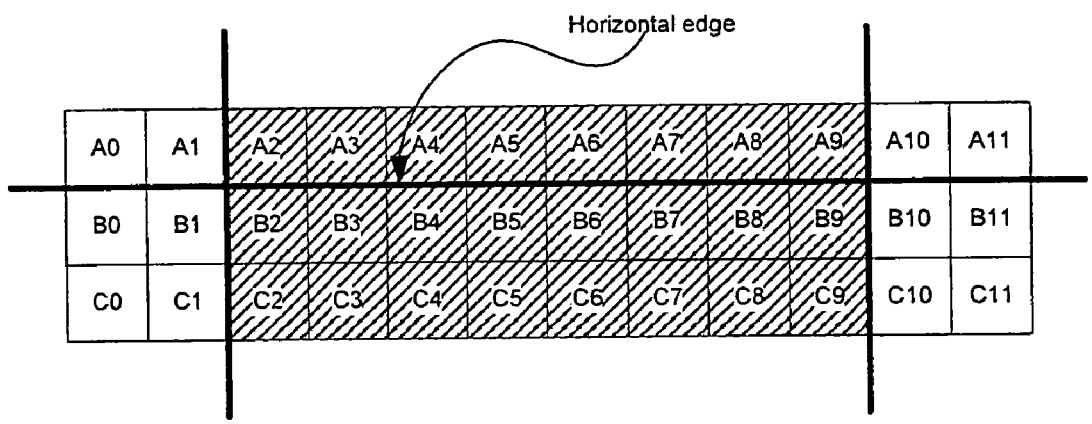
Figure 16C:
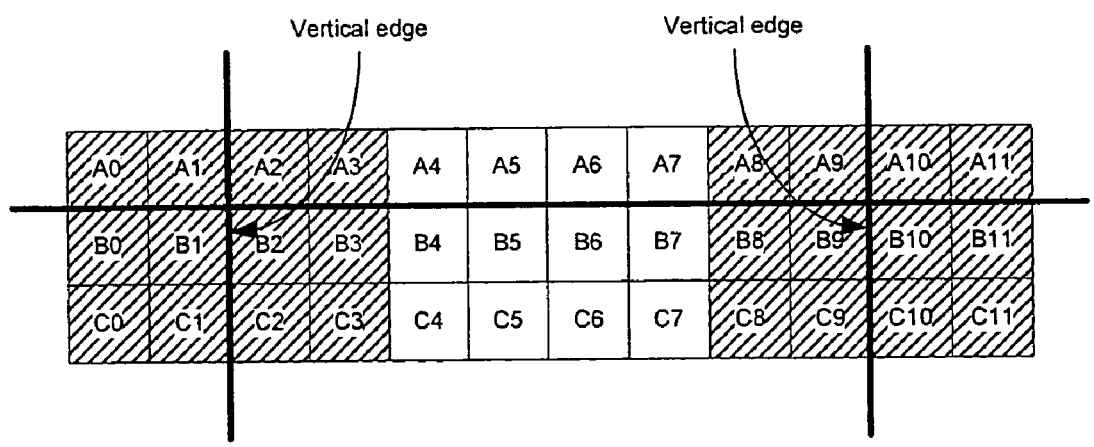

FIGS. 16A-16C illustrate exemplary vertical and/or horizontal detection, in accordance with an embodiment of the invention. Referring to FIG. 16A, there is shown a region of an image that comprises a top border of an image block with a top row of pixels that comprises the pixels labeled B2 through B9. The top row of pixels of the image block is indicated by widely spaced hashed lines. When a horizontal edge is detected, the pixels labeled B2 through B9 in the top row of the image block that is adjacent to the horizontal edge may be filtered to reduce the effect of block noise. Referring to FIG. 16B, there is shown an exemplary region of the image that may be utilized for detecting a horizontal edge adjacent to the top border of an image block. The region comprises the pixels labeled A2 through A9, the pixels labeled B2 through B9, and the pixels labeled C2 through C9. Widely spaced hashed lines indicate the pixels in the detection region.

Referring to FIG. 16C, to detect the presence of a horizontal edge at the top border of an image block, at least one vertical edge on a vertical border of the image block may also be selected. There is shown in FIG. 16C exemplary regions of the image that may be utilized for detecting at least one vertical edge on a vertical border of the image block. For the left vertical border, the exemplary region may comprise the pixels labeled A0 through A3, the pixels labeled B0 through B3, and the pixels labeled C0 through C3. For the right vertical border, the exemplary region may comprise the pixels labeled A8 through A11, the pixels labeled B8 through B11, and the pixels labeled C8 through C11. Widely spaced hashed lines indicate the pixels in the detection region. While FIGS. 16A-16C indicate an exemplary approach that may be followed for detecting the presence of a horizontal edge adjacent to the top row of pixels in the image block, a similar approach may also be followed for detecting the presence of a horizontal edge adjacent to the bottom row of pixels in the image block.

A horizontal edge variance parameter for the horizontal edge being processed may be determined by computing for every image block and for every pixel that comes in the following exemplary expressions:

$$\text{vvar\_top} = \text{SUM}[\text{ABS}(A0-B0)],$$

$$\text{vvar\_bottom} = \text{SUM}[\text{ABS}(B0-C0)],$$

$$\text{max\_top} = \text{MAX}[\text{ABS}(A0-B0)],$$

$$\text{max\_bottom} = \text{MAX}[\text{ABS}(B0-C0)],$$

where SUM corresponds to an addition operation, vvar_top is a top field variance parameter, vvar_bottom is a bottom field variance parameter, max_top is a maximum top field variance, and max_bottom is a maximum bottom field variance. The computations may be performed cumulative over every horizontal edge. For example, the values for vvar_top, vvar_bottom, maxt_top, and max_bottom may be determined for all 8 columns of pixels in a horizontal edge. These values may be determined serially as the pixels are shifted through the pixel buffer 306 in FIG. 3. Once these values are determined, they may be latched or stored before further processing takes place.

For pixels in a row of pixels that is above a horizontal edge in a top field or above a horizontal edge in a frame when progressive video is utilized, a current horizontal edge clamping limit (limit) may be determined by the following expression:

$$\text{limit} = \text{vvar\_top} - b\_\text{rel} \ast \text{vvar\_bottom}/4,$$

where b_rel is the relative weight parameter utilized by the VBNR block 310 in FIG. 3 and 4 corresponds to an exemplary scaling factor. For pixels in a row of pixels that is below a horizontal edge in a bottom field or below a horizontal edge in a frame when progressive video is utilized, a current horizontal edge clamping limit (limit) may be determined by the following expression:

$$\text{limit} = \text{vvar\_bottom} - b\_\text{rel} \ast \text{vvar\_top}/4,$$

where b_rel is again the relative weight parameter utilized by the VBNR block 310 and 4 corresponds to an exemplary scaling factor. In any other instance, the value of the current horizontal edge clamping limit (limit) may be set to zero. The value of the parameter limit may also be scaled and further limited by the following expressions:

$$\text{limit} = \text{limit}/4,$$

$$\text{limit} = \text{MIN}[\text{limit}, b\_\text{core} - \text{max\_vvar}],$$

where b_core is the block core limit utilized by the VBNR block 310, and max_vvar corresponds to the value of max_top when the bottom row of pixels in an image block for bottom fields or progressive video are to be filtered and max_vvar corresponds to the value of max_bottom when the top row of pixels in an image block for top fields or progressive video are to be filtered.

For the currently selected image block, the VBNR block 310 may have been used to determine a left vertical edge clamping limit (limit_left) and a current vertical edge clamping limit (limit_current) that may be utilized for determining whether vertical edges also exist in the current image block. In this regard, a current vertical-horizontal edge clamping limit (hlimit) may be determined as follows:

$$\text{hlimit} = \text{MAX}[\text{limit\_left}, \text{limit\_current}],$$

When portions of a horizontal edge extend beyond the boundaries of a video image, the horizontal edge may not be filtered. When a horizontal edge starts and/or ends in a video image boundary, and/or close to the video image boundary, it may only have one vertical edge. In this instance, the value of the parameter hlimit may be set to the vertical edge clamping limit value of the existing vertical edge.

The value of the current horizontal edge clamping limit (limit) and the value of the current vertical-horizontal edge clamping limit (hlimit) may be combined to determine a horizontal combined clamping limit (combined_limit) based on the following expression:

$$\text{combined\_limit} = \text{MIN}[\text{limit}, \text{hlimit}],$$

if (combined_limit<0){combined_limit=0}.

A filter may be applied to all the pixels in the row adjacent to the horizontal edge. For the top row of pixels in an image block for top fields or progressive video, the exemplary value of a filtered pixel (filt_pixel) may be given by the following expression:

$$\text{filt\_pixel} = (B \ast 5 + A \ast 3 + 4)/8,$$

where B corresponds to the value of the B-labeled pixels, A corresponds to the value of the corresponding A-labeled pixels, and 8 is an exemplary scaling factor. For the bottom row of pixels in an image block for bottom fields or progressive video, the exemplary value of a filtered pixel (filt_pixel) may be given by the following expression:

$$\text{filt\_pixel} = (B*5 + C*3 + 4)/8,$$

where B corresponds to the value of the B-labeled pixels, C corresponds to the value of the corresponding C-labeled pixels, and 8 is an exemplary scaling factor. A difference parameter may be determined based on an original pixel value (original_pix) and a filtered pixel value (filt_pix). For example, the difference parameter may be determined by:

$$\text{dif} = \text{filt\_pix} - \text{original\_pix}.$$

A horizontal block noise reduction difference parameter (HBNR_diff) may be determined based on the difference parameter and the horizontal combined clamping limit (combined_limit). An exemplary HBNR_diff may be determined as follows:

$$\text{HBNR\_diff} = \text{CLAMP}(\text{diff}, -\text{combined\_limit}, +\text{combined\_limit})$$

where CLAMP may correspond to a clamping or limiting operation.

Figure 17:
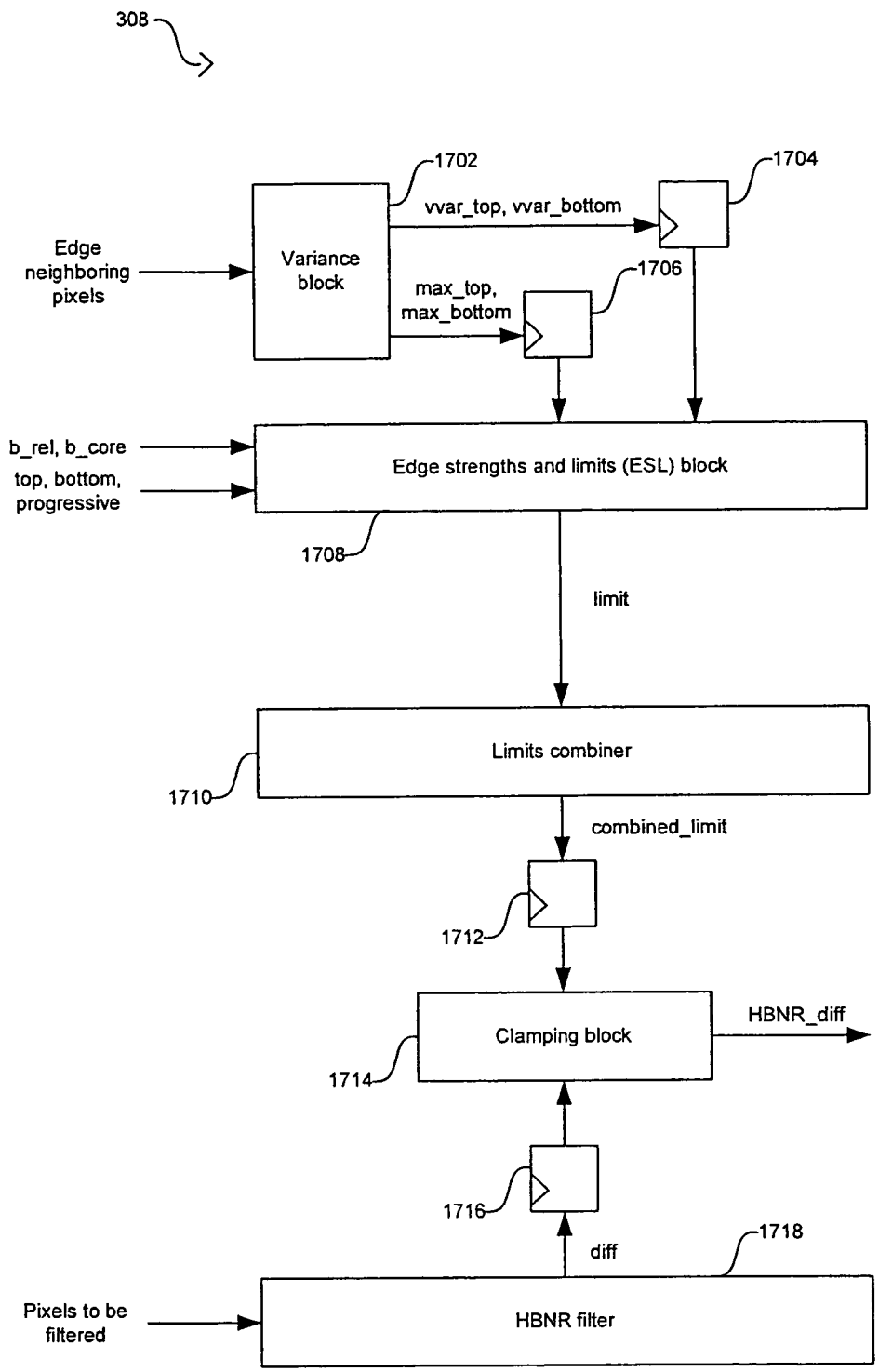
FIG. 17 is a block diagram of an exemplary horizontal BNR block, in accordance with an embodiment of the invention.

FIG. 17 is a block diagram of an exemplary horizontal BNR block, in accordance with an embodiment of the invention. Referring to FIG. 17, the HBNR block 308 in FIG. 3 may comprise a variance block 1702, a latch 1704, a latch 1706, an edge strengths and limits (ESL) block 1708, a limits combiner 1710, a latch 1712, a clamping block 1714, a latch 1716, and a horizontal block noise reduction (VBNR) filter 1718. The variance block 1702 may comprise suitable logic, circuitry, and/or code that may be adapted to determine the parameters vvar_top, vvar_bottom, max_top, and max_bottom for a horizontal edge being processed. The latches 1704, 1706, 1712, and 1716 may comprise suitable logic and/or circuitry that may be adapted to store information. The variance block 1702 may transfer the values of war top and vvar_bottom to the latch 1704 and the values of max_top and max_bottom to the latch 1106.

The ESL block 1708 may comprise suitable logic, circuitry, and/or code that may be adapted receive the horizontal edge parameters stored in the latches 1704 and 1706 to determine the value of the current horizontal edge clamping limit (limit). In this regard, the ESL block 1708 may utilize the relative weight parameter (b_rel), the block core limit (b_core) during processing, and/or information regarding whether the video signal is interlaced video and the current field is a top field or bottom field or whether the video signal is progressive video. The ESL block 1708 may transfer the value for the current horizontal edge clamping limit to the limits combiner 1710. The limits combiner 1710 may comprise suitable logic, circuitry, and/or code that may be adapted to receive the current horizontal edge clamping limit, the current vertical edge clamping limit, and the left vertical edge clamping limit to determine the horizontal combined clamping limit (combined_limit) to be utilized with the pixels in the row of pixels adjacent to the horizontal edge. The limits combiner 1710 may be adapted to transfer the values for combined_limit to the latch 1712. The latch 1712 may be adapted to transfer the values of combined_limit to the clamping block 1714.

The HBNR filter 1718 may comprise suitable logic, circuitry, and/or code that may be adapted to filter the original values of the pixels in the row of pixels adjacent to the horizontal edge and to determine a difference parameter (diff) based on the original and filtered values. The values of the filter coefficients utilized by the HBNR filter 1718 may be programmable via, for example, the host processor 204 and/or via a register direct memory access (DMA). The HBNR filter 1718 may be adapted to transfer the value of the difference parameter to the latch 1716. The latch 1716 may be adapted to transfer the value of the difference parameter to the clamping block 1714. The clamping block 1714 may comprise suitable logic, circuitry, and/or code that may be adapted to determine the horizontal block noise reduction difference parameter (HBNR_diff) based on the values of combined_limit and diff. The clamping block 1714 may be adapted to transfer the value of HBNR_diff to the combiner 312 in FIG. 3.

When processing the first and last vertical edges in a video image, that is, the picture border or boundary, filtering may not be utilized. In this regard, the vertical combined edge clamping limits may be set to zero, for example. When processing the next to the first and next to the last vertical edges in a video image, the values of temp and temp2 may be set to b_core/4, for example.

Figure 18:
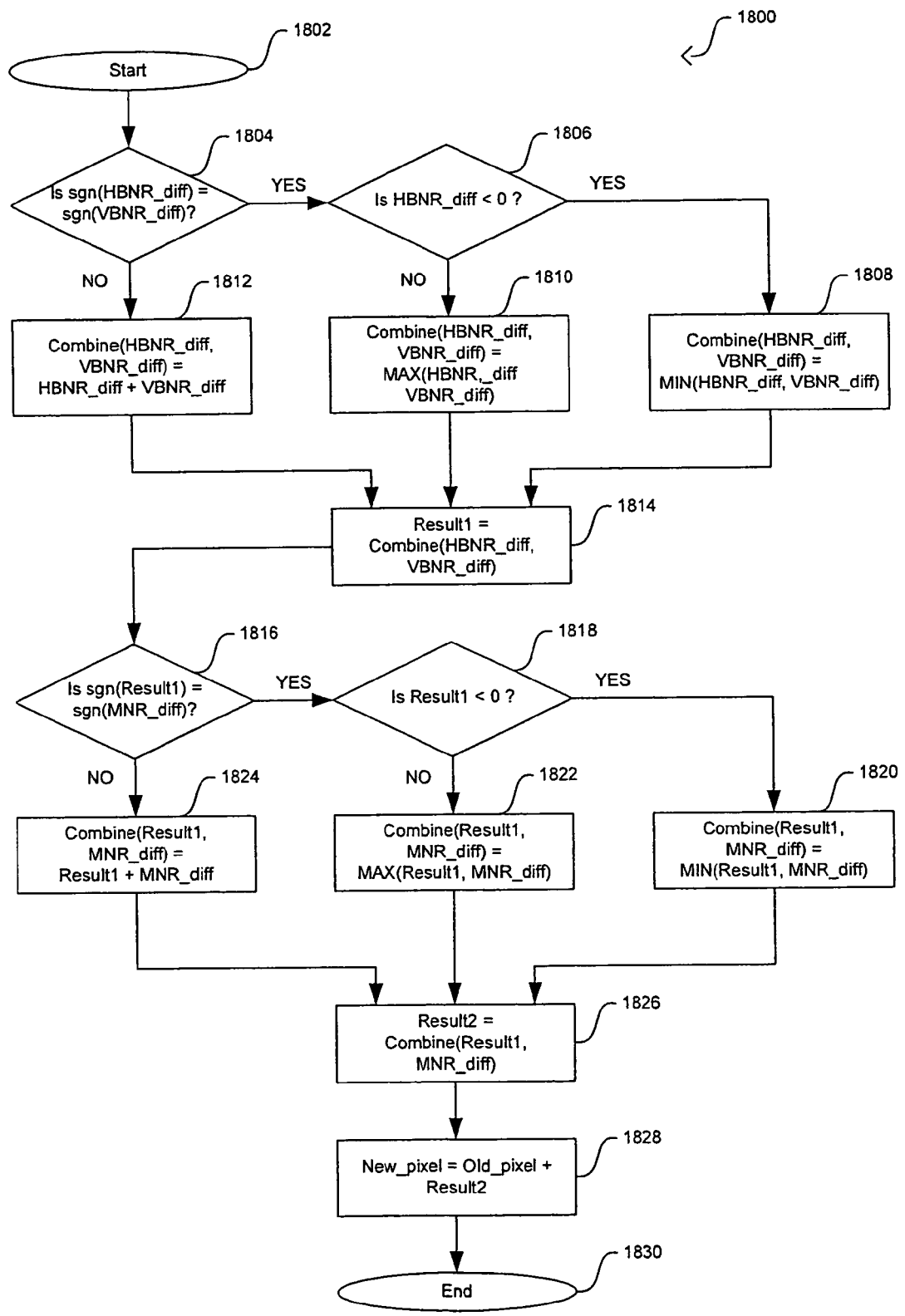
FIG. 18 is a flow diagram illustrating exemplary steps for determining new pixel values with reduced noise artifacts, in accordance with an embodiment of the invention.

FIG. 18 is a flow diagram illustrating exemplary steps for determining new pixel values with reduced noise artifacts, in accordance with an embodiment of the invention. Regarding FIG. 18, the combiner 312 in FIG. 3 may receive the parameter HBNR_diff determined by the HBNR block 308, the parameter VBNR_diff determined by the VBNR block 310, and the parameter MNR_diff determined by the MNR filter 316. The parameters HBNR_diff, VBNR_diff, and MNR_diff correspond to the results of the video noise correction algorithms described herein for horizontal block noise, vertical block noise, and mosquito block noise respectively. Moreover, the combiner 312 may also receive original pixel values from the pixel buffer 306. In step 1804, the combiner 312 may determine whether the value of parameter HBNR_diff and the value of parameter VBNR_diff have the same sign, that is, whether they are both positive or both negative. In this regard, positive may refer to a parameter that is equal or larger than zero. When the value of parameter HBNR_diff and the value of parameter VBNR_diff have the same sign, the flow chart 1800 may proceed to step 1806. In step 1806, the combiner 312 may determine whether the value of parameter HBNR_diff and the value of parameter VBNR_diff are both negative. When the value of parameter HBNR_diff and the value of parameter VBNR_diff are both negative, the flow chart 1800 may proceed to step 1808. In step 1808, the combiner 312 may select a first combination operation to be a minimum of the value of parameter HBNR_diff and the value of parameter VBNR_diff.

Returning to step 1806, when the value of parameter HBNR_diff and the value of parameter HBNR_diff are both positive, the flow chart 1800 may proceed to step 1810. In step 1810, the combiner 312 may select the first combination operation to be a maximum of the value of parameter HBNR_diff and the value of parameter VBNR_diff. Returning to step 1804, when the value of parameter HBNR_diff and the value of parameter VBNR_diff have different signs, the flow chart 1800 may proceed to step 1812. In step 1812, the combiner 312 may select the first combination operation to be an addition of the value of parameter HBNR_diff and the value of parameter VBNR_diff. In step 1814, the combiner 312 may determine a first result (Result1) by utilizing an appropriate first combination operation from steps 1808, 1810, and 1812 in accordance with the signs of the value of parameter HBNR_diff and the value of parameter VBNR_diff. The first result (Result1) may correspond to a block noise parameter that comprises information that may be utilized to correct for vertical block noise and/or for horizontal block noise in a pixel. In this regard, the first result may also correspond to a first pixel correction value that may be utilized to correct noise in a video image. In some instances, an initial or original pixel value (old_pixel) from the pixel buffer 306 may be added to the first pixel correction value to determine a new pixel value (new_pixel) that may have reduced block noise artifacts.

In step 1816, the combiner 312 may determine whether the value of MNR_diff and the value of the first result have the same sign, that is, whether they are both positive or both negative. When the value of parameter MNR_diff and the value of the first result (Result1) have the same sign, the flow chart 1500 may proceed to step 1818. In step 1818, the combiner may determine whether the value of parameter MNR_diff and the value of the first result are both negative. When the value of parameter MNR_diff and the value of the first result are both negative, the flow chart 1800 may proceed to step 1820. In step 1820, the combiner 312 may select a second combination operation to be a minimum of the value of parameter MNR_diff and the value of the first result.

Returning to step 1818, when the value of parameter MNR_diff and the value of the first result are both positive, the flow chart 1800 may proceed to step 1822. In step 1822, the combiner 312 may select the second combination operation to be a maximum of the value of parameter MNR_diff and the value of the first result. Returning to step 1816, when the value of parameter MNR_diff and the value of the first result have different signs, the flow chart 1800 may proceed to step 1824. In step 1824, the combiner 312 may select the second combination operation to be an addition of the value of parameter MNR_diff and the value of the first result. In step 1826, the combiner 312 may determine a second result (Result2) by utilizing an appropriate second combination operation from steps 1820, 1822, and 1824 in accordance with the signs of the value of parameter MNR_diff and the value of the first result. The value of the second result (Result2) may correspond to a second pixel correction value that may be utilized to correct noise effects. In step 1828, an initial or original pixel value (old_pixel) from the pixel buffer 306 may be added to the second pixel correction value determined in step 1826 to determine a new pixel value (new_pixel) that may have reduced mosquito and/or block noise artifacts.

Although an embodiment of the invention has been described principally in conjunction with the parameters HBNR_diff, VBNR_diff, and MNR_diff, it should be appreciated that the invention may be applicable to results from a plurality of video noise reduction algorithms that may be utilized to correct a pixel value in a video image. In this regard, at least two results from video noise correction algorithms may be utilized substantially as described in the exemplary steps of FIG. 18 to correct pixel values in a video image.

One embodiment of the invention may provide a machine-readable storage having stored thereon a computer program having at least one code section for image processing. The at least one code section may be executable by a machine for causing the machine to perform steps for combining results of at least a first reduction algorithm and a second noise reduction algorithm for reducing noise in MPEG-coded video images as described herein. The first noise reduction algorithm may be, for example, mosquito noise, while the second noise reduction algorithm may be, for example, block noise.

The approach described herein may provide an effective and simplified solution that may be implemented to reduce the presence of noise artifacts without over processing and without any perceptible degradation in video quality.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing, the method comprising:
performing by one or more processors and/or circuits within an image processing device:
combining results from a first video noise reduction operation and results from a second video noise reduction operation based on a first combination operation, wherein said second video noise reduction operation is different from said first video noise reduction operation;
selecting said first combination operation to be a first addition operation, a first maximum value operation, or a first minimum value operation based on a sign of said results from said first video noise reduction operation and a sign of said results from said second video noise reduction operation; and
generating a first pixel correction value based on results of said selected first combination operation.

2. The method according to claim 1, comprising correcting at least one pixel value utilizing said generated first pixel correction value.

3. The method according to claim 1, comprising selecting said first minimum value operation when said results from said first noise reduction operation and said results from said second noise reduction operation are both negative.

4. The method according to claim 1, comprising selecting said first maximum value operation when said results from said first noise reduction operation and said results from said second noise reduction operation are both positive.

5. The method according to claim 1, comprising selecting said first addition operation when said results from said first noise reduction operation and said results from said second noise reduction operation have different signs.

6. The method according to claim 1, wherein said results from said first noise reduction operation correspond to results from a horizontal block noise reduction operation.

7. The method according to claim 1, wherein said results from said second noise reduction operation correspond to results from a vertical block noise reduction operation.

8. The method according to claim 1, comprising:
    combining said generated first pixel correction value and results from a third video noise reduction operation based on a second combination operation;
    selecting said second combination operation to be a second addition operation, a second maximum value operation, or a second minimum value operation based on a sign of said generated first pixel correction value and a sign of said results from said third video noise reduction operation; and
    generating a second pixel correction value based on results of said selected second combination operation.

9. The method according to claim 8, comprising correcting at least one pixel value utilizing said generated second pixel correction value.

10. The method according to claim 8, comprising selecting said second minimum value operation when said generated first pixel correction value and said results from said third noise reduction operation are both negative.

11. The method according to claim 8, comprising selecting said second maximum value operation when said generated first pixel correction value and said results from said third noise reduction operation are both positive.

12. The method according to claim 8, comprising selecting said second addition operation when said generated first pixel correction value and said results from said third noise reduction operation have different signs.

13. The method according to claim 8, wherein said results from said third noise reduction operation correspond to results from a mosquito noise reduction operation.

14. A system for image processing, the system comprising:
    one or more circuits that are operable to combine results from a first video noise reduction operation and results from a second video noise reduction operation based on a first combination operation, wherein said second video noise reduction operation is different from said first video noise reduction operation;
    said one or more circuits are operable to select said first combination operation to be a first addition operation, a first maximum value operation, or a first minimum value operation based on a sign of said results from said first video noise reduction operation and a sign of said results from said second video noise reduction operation; and
    said one or more circuits are operable to generate a first pixel correction value based on results of said selected first combination operation.

15. The system according to claim 14, wherein said one or more circuits are operable to correct at least one pixel value utilizing said generated first pixel correction value.

16. The system according to claim 14, wherein said one or more circuits are operable to select said first minimum value operation when said results from said first noise reduction operation and said results from said second noise reduction operation are both negative.

17. The system according to claim 14, wherein said one or more circuits are operable to select said first maximum value operation when said results from said first noise reduction operation and said results from said second noise reduction operation are both positive.

18. The system according to claim 14, wherein said one or more circuits are operable to select said first addition operation when said results from said first noise reduction operation and said results from said second noise reduction operation have different signs.

19. The system according to claim 14, wherein said results from said first noise reduction operation correspond to results from a horizontal block noise reduction operation.

20. The system according to claim 14, wherein said results from said second noise reduction operation correspond to results from a vertical block noise reduction operation.

21. The system according to claim 14, wherein:
    said one or more circuits are operable to combine said generated first pixel correction value and results from a third video noise reduction operation based on a second combination operation;
    said one or more circuits are operable to select said second combination operation to be a second addition operation, a second maximum value operation, or a second minimum value operation based on a sign of said generated first pixel correction value and a sign of said results from said third video noise reduction operation; and
    said one or more circuits are operable to generate a second pixel correction value based on results of said selected second combination operation.

22. The system according to claim 21, correct at least one pixel value utilizing said generated second pixel correction value.

23. The system according to claim 21, wherein said one or more circuits are operable to select said second minimum value operation when said generated first pixel correction value and said results from said third noise reduction operation are both negative.

24. The system according to claim 21, wherein said one or more circuits are operable to select said second maximum value operation when said generated first pixel correction value and said results from said third noise reduction operation are both positive.

25. The system according to claim 21, wherein said one or more circuits are operable to select said second addition operation when said generated first pixel correction value and said results from said third noise reduction operation have different signs.

26. The system according to claim 21, wherein said results from said third noise reduction operation correspond to results from a mosquito noise reduction operation.

* * * * *